(12) United States Patent
Furukawa

(10) Patent No.: US 8,190,719 B2
(45) Date of Patent: May 29, 2012

(54) TRANSMITTING SETTING DATA FROM A TERMINAL DEVICE TO TARGET DEVICES

(75) Inventor: Akihiro Furukawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1010 days.

(21) Appl. No.: 11/237,969

(22) Filed: Sep. 29, 2005

(65) Prior Publication Data

US 2006/0242272 A1    Oct. 26, 2006

(30) Foreign Application Priority Data

Sep. 29, 2004 (JP) ................................. 2004-284000

(51) Int. Cl.
*G06F 15/177* (2006.01)

(52) U.S. Cl. ........ 709/221; 709/222; 709/224; 709/230; 370/352; 715/738; 715/736; 717/168

(58) Field of Classification Search ........... 709/221–224
See application file for complete search history.

(56) References Cited

U.S. PATENT DOCUMENTS

| | | | |
|---|---|---|---|
| 5,872,928 A | 2/1999 | Lewis et al. | |
| 6,041,347 A * | 3/2000 | Harsham et al. | ............ 709/220 |
| 6,559,964 B1 | 5/2003 | Tsukamoto et al. | |
| 6,701,358 B1 * | 3/2004 | Poisson et al. | ............ 709/223 |
| 6,988,133 B1 * | 1/2006 | Zavalkovsky et al. | ......... 709/223 |
| 7,016,740 B2 | 3/2006 | Nakamura et al. | |
| 7,047,088 B2 | 5/2006 | Nakamura et al. | |
| 7,159,022 B2 * | 1/2007 | Primm et al. | ............ 709/224 |
| 7,249,189 B2 * | 7/2007 | Refai et al. | ............ 709/230 |
| 7,277,943 B1 * | 10/2007 | Surazski | ............ 709/226 |
| 2002/0054587 A1 | 5/2002 | Baker et al. | |
| 2002/0069274 A1 | 6/2002 | Tindal et al. | |
| 2002/0124081 A1 * | 9/2002 | Primm et al. | ............ 709/224 |
| 2002/0165945 A1 * | 11/2002 | Buswell et al. | ............ 709/221 |
| 2003/0177220 A1 | 9/2003 | Ohara | |
| 2003/0179227 A1 | 9/2003 | Ahmad et al. | |
| 2003/0218628 A1 | 11/2003 | Deshpande et al. | |
| 2004/0006618 A1 | 1/2004 | Kasai et al. | |
| 2004/0133553 A1 | 7/2004 | Suto | |
| 2004/0139193 A1 * | 7/2004 | Refai et al. | ............ 709/224 |
| 2004/0181790 A1 | 9/2004 | Herrick | |
| 2005/0097194 A1 * | 5/2005 | Eisenbeis et al. | ............ 709/221 |
| 2005/0204022 A1 * | 9/2005 | Johnston et al. | ............ 709/220 |

FOREIGN PATENT DOCUMENTS

EP    0 918 411 A1    5/1999

(Continued)

OTHER PUBLICATIONS

JP Office Action dtd Mar. 11, 2008, JP App 2004-284000.

(Continued)

*Primary Examiner* — Hua Fan
(74) *Attorney, Agent, or Firm* — Banner & Witcoff, Ltd.

(57) ABSTRACT

A method of transmitting setting data from a terminal device to target devices on a network is provided. The method includes the steps of preparing new setting data for the target devices, obtaining current setting data to which the target devices are currently set, comparing the new setting data with current setting data, and notifying a user of a result of the comparison.

27 Claims, 23 Drawing Sheets

FOREIGN PATENT DOCUMENTS

| | | |
|---|---|---|
| EP | 1052806 A | 11/2000 |
| EP | 1 085 694 A2 | 3/2001 |
| JP | 09-149076 | 6/1997 |
| JP | 2001-86118 A | 3/2001 |
| JP | 2001-256154 A | 9/2001 |
| JP | 2001-312432 A | 11/2001 |
| JP | 2003-273873 | 9/2003 |
| JP | 2004-30062 A | 1/2004 |
| JP | 2004-40433 A | 2/2004 |
| JP | 2004-54657 A | 2/2004 |
| JP | 2004-199443 A | 7/2004 |
| JP | 2002-342041 A | 6/2008 |
| WO | 01/73558 A1 | 10/2001 |

OTHER PUBLICATIONS

JP Office Action dtd May 27, 2008, JP Appln. 2004-284000.

* cited by examiner

| Item | Current Value | Update Value |
|---|---|---|
| Emulation | AUTO | |
| Feeder | Auto | |
| Media Type | Plain paper | |
| Resolution | 600 | |
| Page Protection | Auto | |
| Copy | 1 | |
| Continue | Manual | Auto |
| Toner Save | OFF | ON |
| Power Save | 1 | |
| Destination | Standard Output Tray | |
| Toner Low | Continue | |
| Reprint | ON | |
| Lower LCD | None | |
| Auto Online | ON | |
| Button Repeat | 0.1 sec | |
| Message Scroll | 1 | |
| Error Buzzer | OFF | |
| Orientation | Portrait | |
| Paper Size | A4 210×297 mm | Letter 8 1/2×11 in |
| Left Margin | 0 | |
| Right Margin | 78 | 80 |
| Top Margin | 0.5 | |
| Bottom Margin | 0.5 | |
| Lines/Page | 64 | 60 |

Status [Change] — NodeXXXXXX — 55

FIG.18

| Item | Current Value | Update Value |
|---|---|---|
| TCP/IP | ON | |
| DLC | ON | OFF |
| NetBIOS/IP | ON | OFF |
| POP3/SMTP | ON | OFF |
| IPP | ON | OFF |
| FTP | ON | |
| SSDP | OFF | |
| mDNS | ON | |
| Network Mode | Automatic | |
| TCP/IP Timeout | 60 minutes | 5 minutes |
| Boot Tries | 3 | |
| DNS Server Method | Static | |
| DNS Server Address1 | 10.134.12.34 | |
| DNS Server Address2 | 10.134.12.35 | |
| Timeout of Gateway | 5 seconds | |
| SMTP Server Address | "smtp.example.com" | "smtp2.example.com" |
| POP3 Server Address | "pop.example.com" | |
| POP3 Polling Frequency | 300 seconds | |
| POP3 Timeout | 120 minutes | |
| NetBIOS Domain Name | "WORKGROUP" | |
| WINS Server Address1 | 10.134.12.36 | |
| WINS Server Address2 | 10.134.12.37 | |
| WINS Server Config | Static | |
| Notification Admin 1 | Unconfigured | |
| Resolution Message 1 | ON | |
| Cover Open 1 | Never | |

FIG.19

TRANSMITTING SETTING DATA FROM A TERMINAL DEVICE TO TARGET DEVICES

CROSS-REFERENCE TO RELATED APPLICATION

This application claims priority of Japanese Patent Application No. 2004-284000, filed on Sep. 29, 2004, the entire subject matter of which is incorporated herein by reference thereto.

BACKGROUND

1. Technical Field

The technical field relates to a method, device, system and computer program product for transmitting setting data to devices on a network.

2. Related Art

A conventional technique for transmitting setting data is to transmit the setting data from a single device to multiple devices at a time via a network. An example of such a single device is described in Japanese Patent Provisional Publication No. HEI 9-149076 (hereafter, referred to as JP HEI 9-149076). According to the technique disclosed in JP HEI 9-149076, setting data for facsimile devices is prepared in a server, and transmitted from the sever to the facsimile devices at a time.

According to the technique, it is unnecessary to conduct an individual setting operation for each of the facsimile devices. Therefore, setting for the facsimile devices is made easier.

Pieces of setting data currently set to devices connected to the network are not always equal to one another. Therefore, there may be a case where, if new setting data is transmitted to the devices at a time, the new setting data for a certain device may be different from setting data previously set for the device, but identical to setting data previously set for another device.

However, for each of the devices it is difficult to check whether setting data is to be changed before the setting data is transmitted. For this reason, if inappropriate setting data is transmitted by error to the devices simultaneously, a phenomenon may occur in which unnecessary setting data update is made for non-target devices (devices which are not targeted for a setting data update) and a necessary setting data update is not made for target devices (devices which are targeted for the setting data update).

SUMMARY

Aspects are advantageous in that they provide at least one of a method, device, system and computer program product for transmitting setting data that for each of the devices allow a user to check whether a setting data update has been made before transmitting setting data to the devices at a time.

There is provided a method of transmitting setting data from a terminal device to target devices on a network. The method includes the steps of preparing new setting data to be set that will be sent to the target devices on the network, obtaining current setting data currently set to the target devices, comparing the new setting data with current setting data, and notifying a user of a result of the comparison.

BRIEF DESCRIPTION OF THE ACCOMPANYING DRAWINGS

FIG. 18 illustrates an advanced setting change window of a first data setting transmission process.

FIG. 19 illustrates an advanced setting change window of a second data setting transmission process.

DETAILED DESCRIPTION

General Overview

Figure 1:
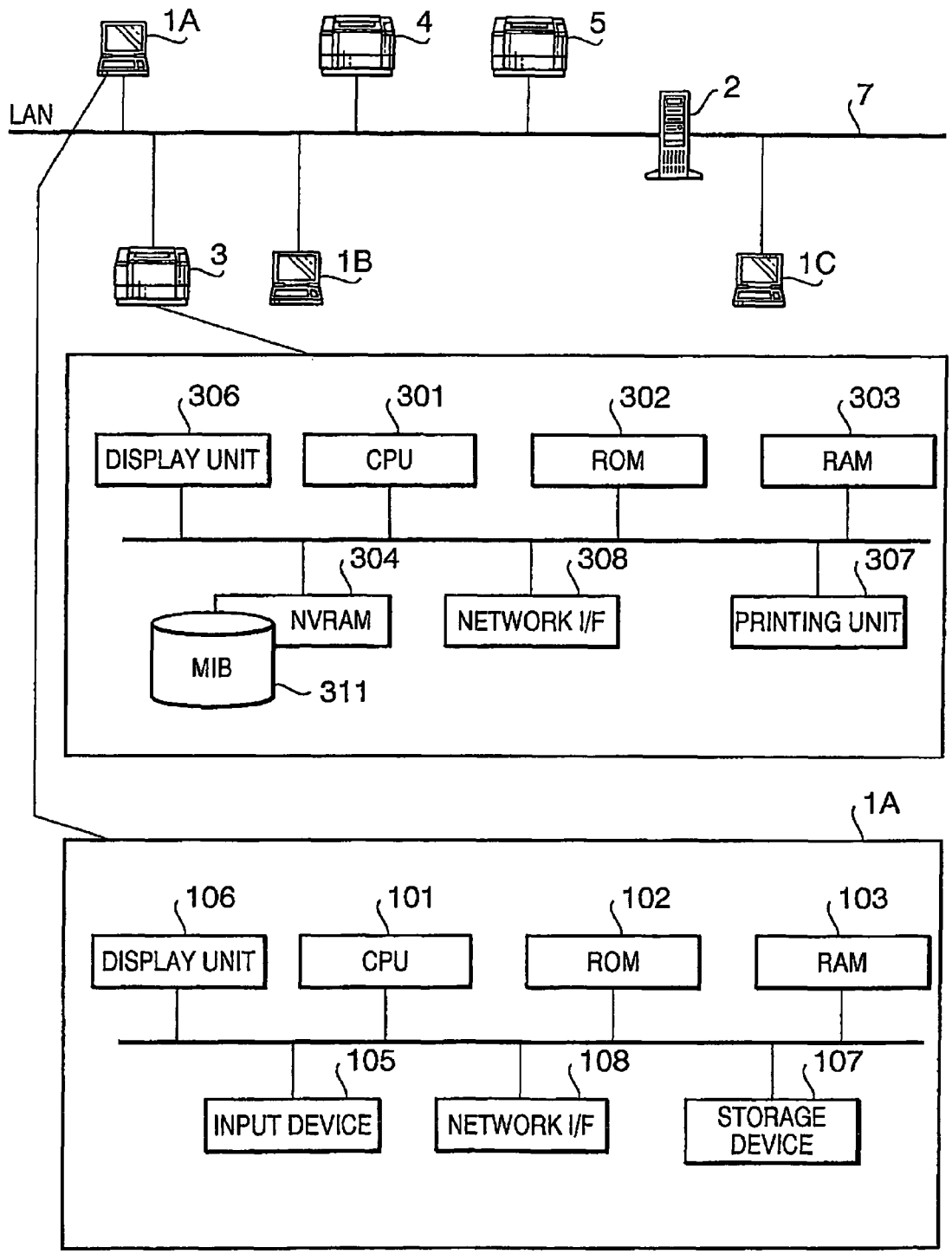
FIG. 1 is a general configuration of a network system in which a setting data transmission system is implemented.

There is provided a method of transmitting setting data from a terminal device to target devices on a network. The method includes the steps preparing new setting data for the plurality of target devices, obtaining current setting data to which the plurality of target devices are currently set, comparing the new setting data with the current setting data, and notifying a user of a result of the comparison.

With this configuration, since the user is notified about the result of the comparison, the user can recognize in advance whether setting data are to be changed with regard to each of the target devices. It becomes possible to transmit the new setting data to the plurality of target devices at a time.

Optionally, the method may include the step of allowing a user to decide whether to start transmitting the new setting data to the target devices after the step of the notifying.

Still optionally, the step of preparing new setting data may include the step of allowing the user to select the target devices from among the devices.

Still optionally, the step of obtaining the current setting data may obtain the current setting data from the target devices.

In an example, the method may include the step of displaying error information when the step of obtaining the current setting data is not successfully completed.

Optionally, the method may include the step of removing a device from the target devices in accordance with a user operation.

In an example, the step of notifying the user of the result of the comparison may include displaying information identifying which portion of the new setting data is different from the current setting data for each of the target devices.

Optionally, the step of preparing the new setting data may include the steps of allowing the user to select a representative device from among the devices, and obtaining representative setting data to which the representative device is currently set. In this case, one of the representative setting data and modified setting data made by modifying the representative setting data may be used as the new setting data.

Still optionally, the method may include the step of allowing the user to designate one of a current data sending type and an updated data sending type. In this case, if the user designates the current data sending type, for example, all of the representative setting data may be transmitted to each of the target devices. Further, if the user designates the updated data sending type, setting data updated with respect to the representative setting data may be transmitted as the new setting data for each of the plurality of target devices.

Still optionally, the representative device may be treated as one of the target devices in that the representative device undergoes the steps of comparing the new setting data with the current setting data, notifying the user of the result of the comparison, and starting to transmit the new setting data.

Still optionally, the representative device may not be subject to the steps of comparing the new setting data with the current setting data, notifying the user of the result of the comparison, and starting to transmit the new setting data.

Still optionally, the method may include the step of transmitting setting data of setting items to the representative device, the setting data of setting items only being applied to the representative device.

In an example, the setting data to be transmitted to the representative device may include data of items specific to the representative device.

Optionally, the preparing step of preparing the new setting data may include the step of allowing the user to select a representative device from among the plurality of devices. In the allowing step of allowing the user to select the plurality of target devices, the representative device can be also selected as one of the plurality of target devices. If the representative device is selected as one of the plurality of target devices, the representative device may be treated as one of the plurality of target devices in the obtaining step, the comparing step and the notifying step.

Still optionally, the method may include the step of transmitting the new setting data only to the representative device in accordance with a user instruction. In this case, the transmitting step of transmitting the new setting data only to the representative device may be performed if the representative device is included in the plurality of target devices and if the new setting data is modified after the new setting data is transmitted to at least one of the plurality of target devices.

Still optionally, the transmitting step of transmitting the new setting data only to the representative device may be performed such that a user instruction is accepted if the representative device is included in the plurality of target devices and if the new setting data is modified after the new setting data is transmitted to at least one of the plurality of target devices, and that a user instruction is not accepted if the representative device is included in the plurality of target devices and if the new setting data is not modified after the new setting data is transmitted to at least one of the plurality of target devices.

Still optionally, the method may include the step of storing the result of the comparison in a log file.

Still optionally, the method may include the steps of allowing the user to modify the new setting data, and performing again the comparing and notifying steps with regard to the modified new setting data.

In an example, the allowing step may be performed after performing the step of notifying the user of a result of the comparison.

Still optionally, the step of allowing the user to modify the new setting data may include allowing the user to select at least one advanced setting target device from among the target devices, and allowing the user to make an advanced setting for the selected at least one advanced setting target device. In this case, advanced setting data made by the advanced setting may be treated as the modified setting data.

Still optionally, the method may include the step of transmitting the advanced setting data to the at least one advanced setting target device and transmitting the new setting data to the target devices other than the at least one advanced setting target device.

Still optionally, the method may include the steps of allowing the user to input a cancellation command after performing the step of notifying the user of a result of the comparison, and repeating the method from the step of preparing new setting data.

Still optionally, the method may include the steps of allowing the user to input a refresh command after performing the step of notifying the user of a result of the comparison, and performing again the steps of the obtaining the current setting data, the comparing the new setting data with the current setting data, and the notifying the user of the result of the comparison if the refresh command is inputted by the user.

Still optionally, the method may include the steps of allowing the user to input a search command after performing the step of notifying the user of a result of the comparison, and searching for devices to include devices among the target devices if the search command is inputted by the user.

Still optionally, the method may include the step of performing again the steps of obtaining the current setting data, comparing the new setting data with the current setting data, and notifying the user of the result of the comparison if a search command is inputted by the user after the step of notifying the user of the result of the comparison and searched devices are included in the plurality of target devices.

In an example, the step of allowing the user to select the target devices may include the steps of searching for devices to be included in the target devices, accepting a user designation of a device to be included in the target devices, and selecting a device found in the search for devices and the device designated by the user as the target devices.

Optionally, the new setting data may include a single piece of data, and the current setting data may include a plurality of pieces of data set to the target devices, respectively.

There is provided a method of transmitting setting data to at least one target device on a network. The method includes the steps of preparing new setting data for the at least one target device on the network, obtaining current setting data to which the at least one target device is currently set, comparing the new setting data with the current setting data, and notifying a user of a result of the comparison.

With this configuration, since the user is notified of the result of the comparison, the user can recognize in advance whether setting data are to be actually changed or not with regard to each of the target devices. It becomes possible to transmit the new setting data to the target devices at a time.

There is provided a terminal device for transmitting setting data to target devices on a network. The terminal device is provided with a preparing system that prepares new setting data for the plurality of target devices, an obtaining system that obtains current setting data to which the target devices are currently set, a comparing system that compares the new setting data with the current setting data of the target devices, a notifying system that notifies a user of a comparison result provided by the comparing system, and a transmitting system that transmits the new setting data to the target devices in accordance with a user operation.

With this configuration, since the user is notified of the result of the comparison, the user can recognize in advance whether setting data are to be actually changed or not with target to each of the target devices. It becomes possible to transmit the new setting data to the plurality of target devices at a time.

There is provided a system for transmitting setting data to target devices on a network. The system is provided with a preparing system that prepares new setting data for the target devices, an obtaining system that obtains current setting data to which the plurality of target devices are currently set, a comparing system that compares the new setting data with the current setting data of the target devices, a notifying system that notifies a user of a comparison result provided by the comparing system, and a transmitting system that transmits the new setting data to the target devices in accordance with a user operation.

With this configuration, since the user is notified of the result of the comparison, the user can recognize in advance whether setting data are to be actually changed or not with target to each of the target devices. It becomes possible to transmit the new setting data to the plurality of target devices at a time.

The device and method according to the present invention can be realized when appropriate programs are provided and executed by a computer. Such programs may be stored in recording medium such as a flexible disk, CD-ROM, memory cards and the like and distributed. Alternatively or optionally, such programs can be distributed through networks such as the Internet.

Illustrative Embodiments

Hereafter, an illustrative embodiment according to the invention will be described with reference to the accompanying drawings.

FIG. 1 shows a general configuration of a network system in which a setting data transmission system is implemented according to the illustrative embodiment of the invention. The network system shown in FIG. 1 includes PCs (personal computers) 1A, 1B and 1C, a router 2, printers 3, 4 and 5, and a LAN (local area network) 7 for connecting these nodes.

According to the illustrative embodiment, the PCs 1A, 1B and 1C have the same configuration, and in FIG. 1, a block diagram of the PC 1A is illustrated as an example. As shown, the PC 1A includes a CPU (central processing unit) 101, a ROM (read only memory) 102, a RAM (random access memory) 103, an input device 105 such as a keyboard and a pointing device, a display unit 106, a storage device 107 such as a hard disc drive, and a network I/F (interface) 108 for connecting the PC 1A to the LAN 7. A multi-task operating system such as Windows®, Linux®, or MacOS® is installed in the PCs 1A, 1B and 1C. The following example assumes that Windows® is installed in the PCs 1A, 1B and 1C. The CPU 101 of the PC 1A executes tasks of programs in parallel on a time-division basis in accordance with a multi-task function of the OS. A setting data transmission process (which is explained in detail later) according to the illustrative embodiment is executed as one of such parallel tasks.

In this illustrative embodiment, the setting data transmission process is executed such that setting data is transmitted to more than one device at a time.

The router 2 has the function of relaying data from one network to another network. Since the printers 3, 4 and 5 have the same configuration, in FIG. 1 a block diagram of the printer 3 is illustrated as an example. As shown in FIG. 1, the printer 3 includes s a CPU (central processing unit) 301, a ROM (read only memory) 302, a RAM (random access memory) 303, a NVRAM (non volatile RAM) 304, a display unit 306 on which various types of messages are displayed, a printing unit 307 having the function of printing images on a recording medium, and a network I/F (interface) 308 for connecting the printer 3 to the LAN 7. As described in detail later, in the setting data transmission process, the PC 1A (1B or 1C) operates, for example, to obtain setting data from one of the printers 3, 4 and 5 and to transmit setting data to the printers 3, 4 and 5 simultaneously.

In this illustrative embodiment, data transmission between the PCs and the printers is performed based on a simple network management protocol (SNMP). Each of the printers 3 to 5 is configured to store a management information base (for example, a MIB 311 stored in the NVRAM 304 of the printer 3). For obtaining setting data from one of the printers 3 to 5, the PC 1A sends a data acquisition request based on SNMP to a target printer (one of the printers 3 to 5). Then, the target printer provides setting data in an MIB (e.g. the MIB 311 of the printer 3), which is managed by and stored in the target printer, for the PC 1A in response to the data acquisition request.

For setting a target printer (one of the printers 3 to 5), the PC 1A sends a data setting request based on SNMP containing setting data to the target printer. Then, the target printer stores the received setting data in its own MIB (e.g. the MIB 311 of the printer 3) in response to the data setting request sent by the PC 1A.

Hereafter, the setting data transmission process performed between the PCs and the printers will be explained. The setting data transmission process includes two types of transmission processes: a first type is a process for setting a principal function of a printing device (e.g. a printer, a multi-function product having a printing function); and a second type is a process for setting a network function of a NIC (a network interface card, for example, the network I/F 308 of the printer 3) provided in the printing device. Hereafter, the first type process is referred to as a first data setting transmission process, and the second type process is referred to as a second data setting transmission process.

Since general flows of the first and second data setting transmission processes are substantially equal to each other, the explanation of the data setting transmission process is made without making a distinction between the first and the second data setting transmission processes. Therefore, in the following, differences between the first and second data setting transmission processes will be explained, only if the necessity arises.

Figure 2:
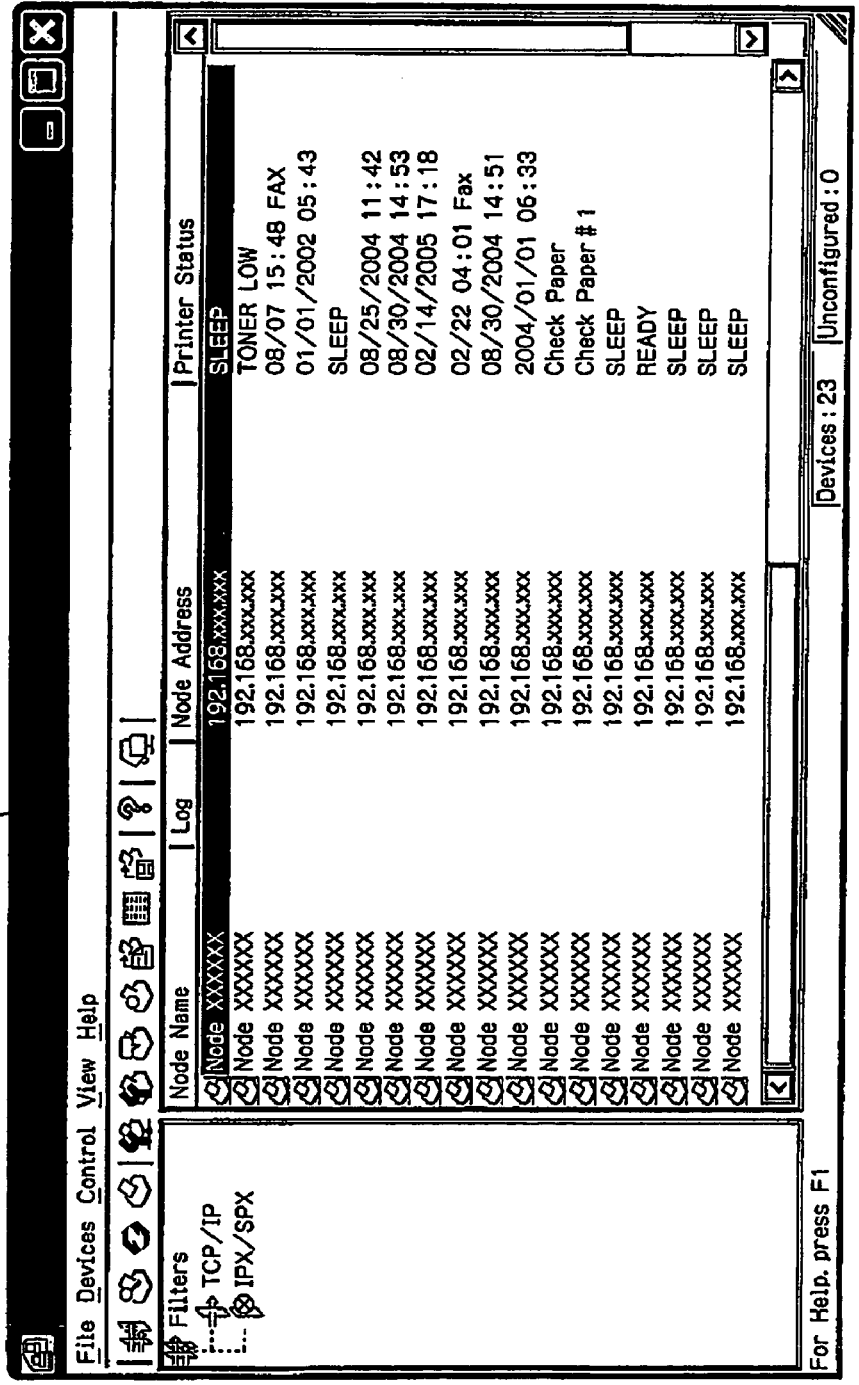
FIG. 2 illustrates a device setting management tool initial screen.
Figure 3:
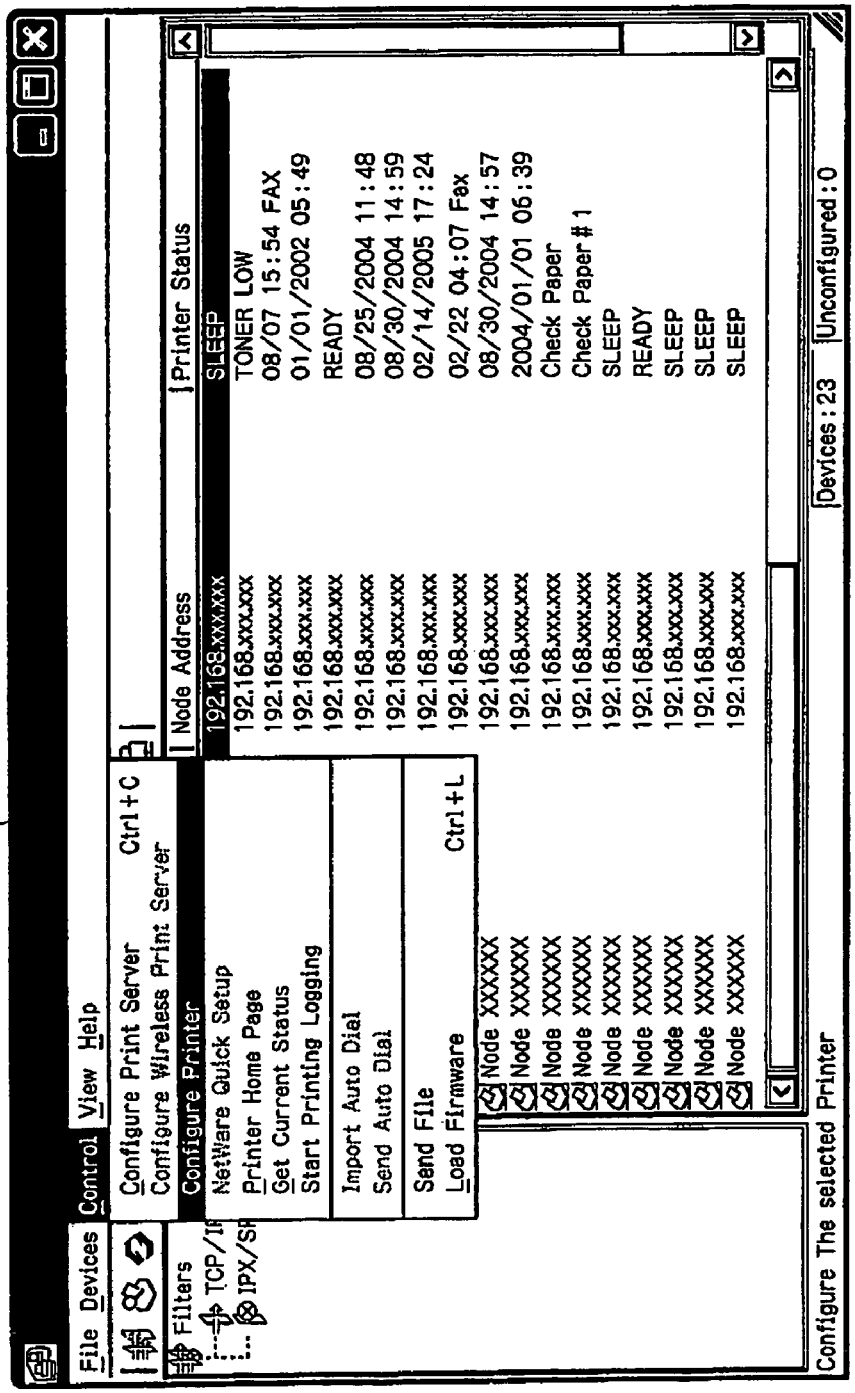
FIG. 3 is an illustrative diagram showing a user operation conducted on the device setting management tool initial screen.
Figure 4:
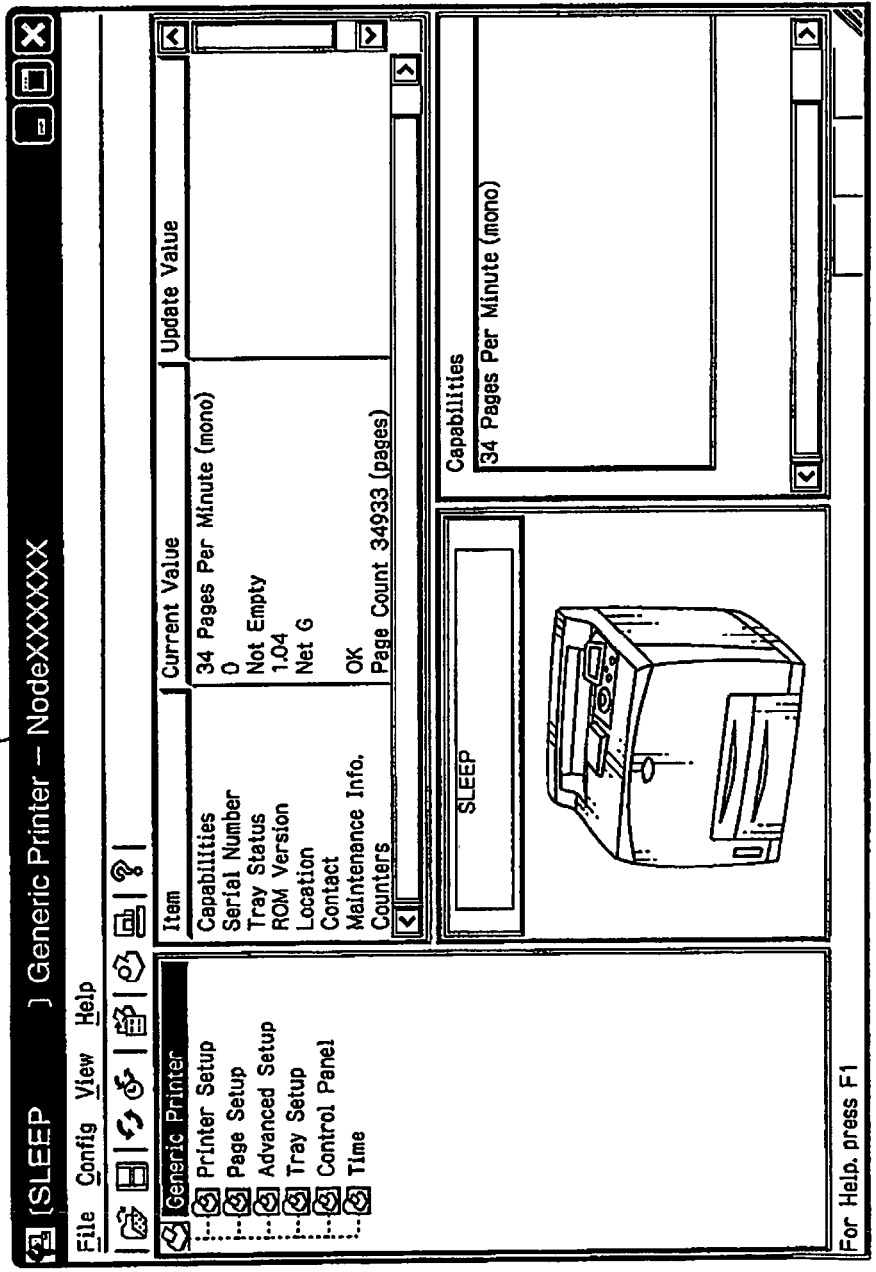
FIG. 4 illustrates a printer setting function initial screen.

First, user interfaces (UI) of the first and second data setting transmission processes are explained. To start the first data setting transmission process, a user operates the PC 1A to initiate a device setting management tool. If the device setting management tool is initiated, a device setting management tool initial screen 11 is displayed, for example as a window, on the display unit 106 of the PC 1A as shown in FIG. 2. In the initial screen 11 of FIG. 2, a list of printing devices (e.g. printers or multi-function products) detected on the network is displayed. If a user selects one of the printing devices listed in the device setting management tool initial screen 11 as a representative device, clicks a "Control" menu (i.e. pointing to the "Control" menu first by using a pointing device and then pushing a button on the pointing device) on a menu bar on the device setting management tool initial screen 11, and then clicks a "Configure printer" menu in a pull-down menu displayed under the "Control" menu (see FIG. 3), a printer setting function initial screen 13 is displayed as shown in FIG. 4.

Figure 5:
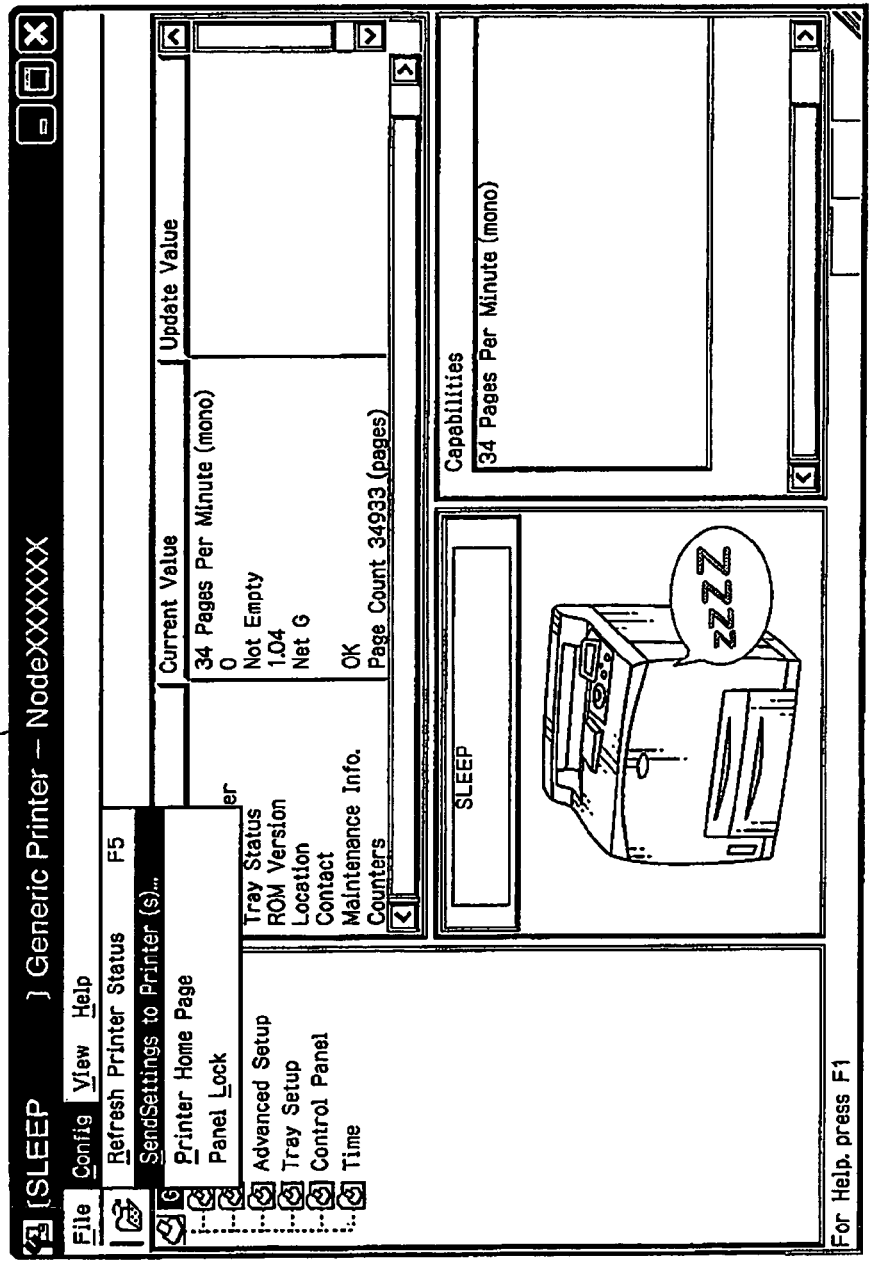
FIG. 5 is an illustrative diagram showing a user operation conducted on the printer setting function initial screen.

The printer setting function initial screen 13 is used to perform the configuration of printing devices (e.g. printers or multi function products). As shown in FIG. 4, in the printer setting function initial screen 13, various types of current settings of the printing device selected in the device setting management tool initial screen 11 (i.e. the representative device) are displayed. By clicking a "Config" menu in a menu bar on the printer setting function initial screen 13, and then clicking a "Send Settings to Printer(s)" menu in a pull-down menu displayed under the "Config" menu (see FIG. 5), the PC 1A initiates the first data setting transmission process.

Figure 6:
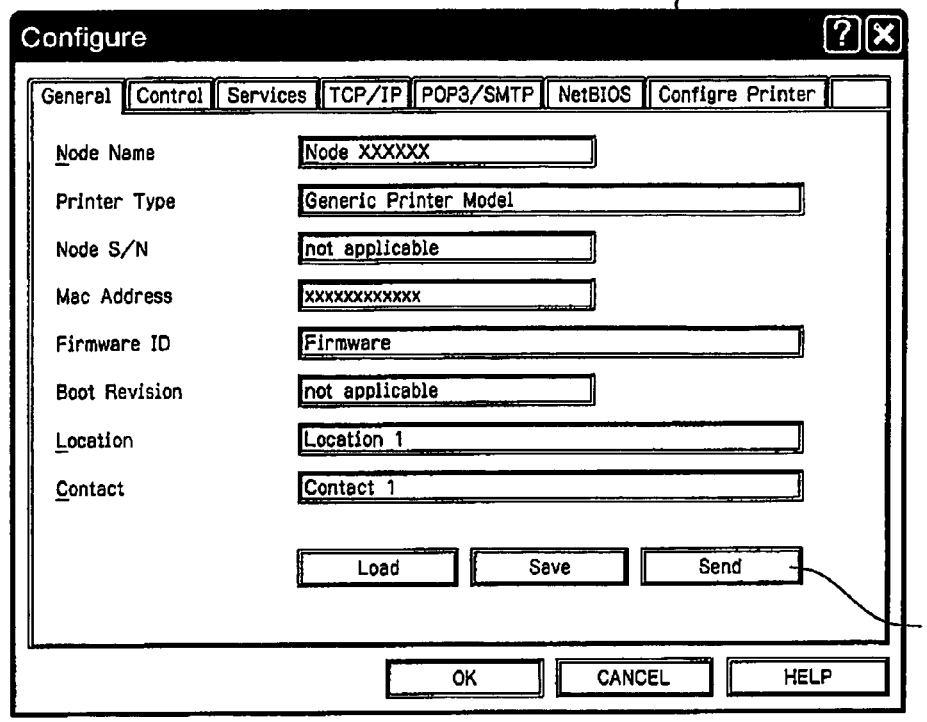
FIG. 6 illustrates a NIC setting dialog box.

For initiating the second data setting transmission process, a user double clicks one of printing devices listed in the device setting management tool initial screen 11 after opening the device setting management tool initial screen 11, or a user clicks a "Control" menu in the menu bar on the device setting management tool initial screen 11 and then clicks "Configure Print Server" in the pull-down menu. Then, a NIC setting dialog box 15 shown in FIG. 6 is displayed. By clicking a "Send" button 17 in a "General" tab on the NIC setting dialog box 15, the PC 1A initiates the second data setting transmission process.

Figure 7:
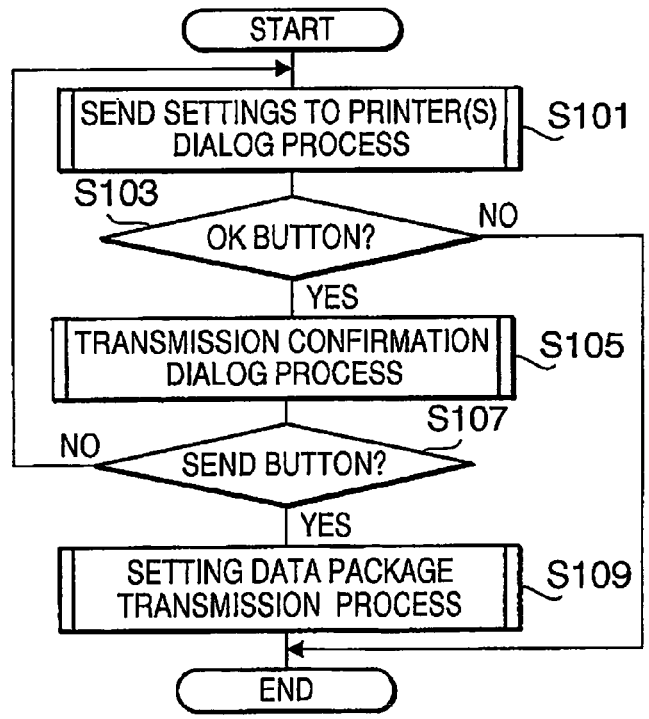
FIG. 7 is a general flowchart applied to first and second data setting transmission processes.

FIG. 7 is a general flowchart applied to both of the first and second data setting transmission process executed under control of the CPU 101 of the PC 1A (1B or 1C). After the initiation of the first or second data setting transmission process, a "Send Settings to Printer(s)" dialog process (step S101) is executed.

Figure 8:
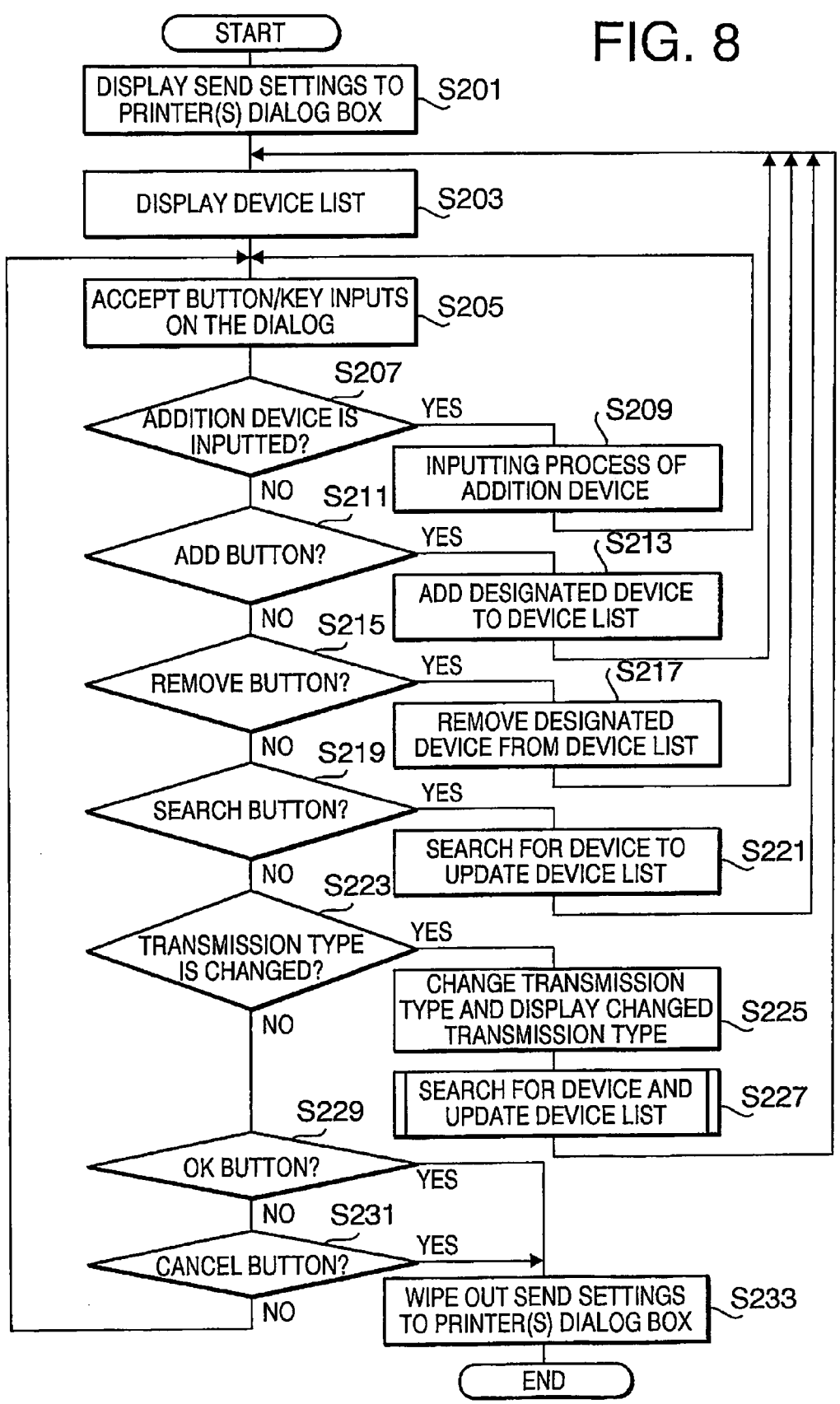
FIG. 8 is a flowchart of a "Send Settings to Printer(s)" dialog process.
Figure 9:
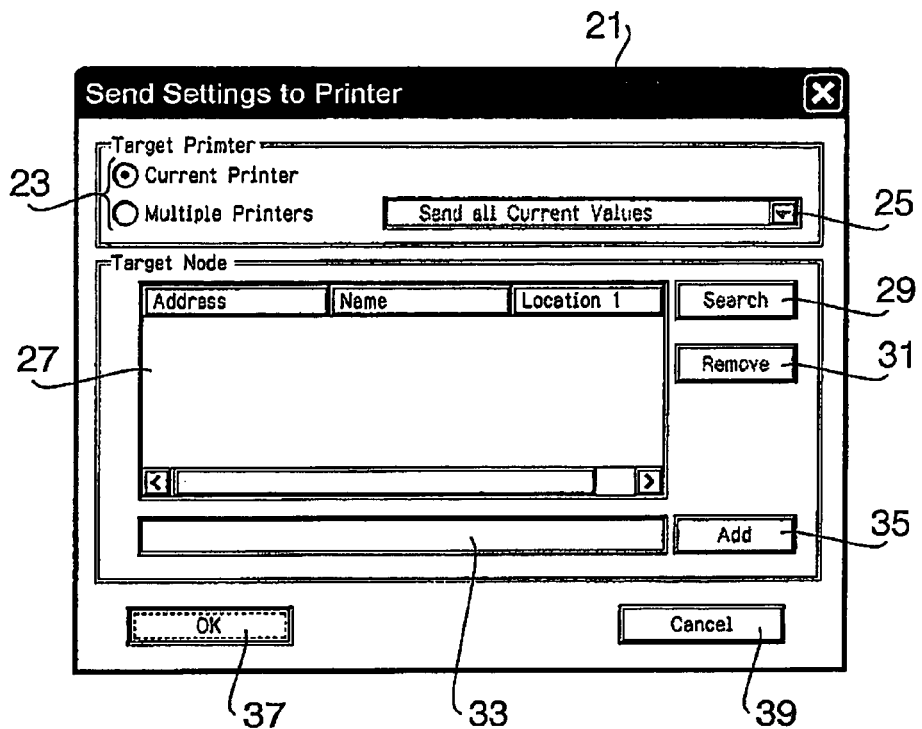
FIG. 9 illustrates a "Send Settings to Printer(s)" dialog box.

FIG. 8 is a flowchart of the "Send Settings to Printer(s)" dialog process. After the "Send Settings to Printer(s)" dialog process is initiated, the PC 1A displays a "Send Settings to Printer(s)" dialog box 21 on the display unit 106 as shown in FIG. 9 (step S201). As shown in FIG. 9, the "Send Settings to Printer(s)" dialog box 21 includes a transmission target selection radio button 23, a transmission type changing instruction field 25, a device list indication field 27, a "Search" button 29, a "Remove" button 31, an additional device input text box 33, an "Add" button 35, an "OK" button 37, and a "Cancel" button 39.

At an initial condition of the "Send Settings to Printer(s)" dialog box 21, the transmission target selection radio button 23 is set to "Current Printer", and the transmission type changing instruction field 25, the device list indication field 27, the "Search" button 29, the "Remove" button 31, the additional device input text box 33, and the "Add" button 35 are grayed out (a grayed out item represents that the item can not accept operation).

If the user sets the transmission target selection radio button 23 to "Multiple Printers", the grayed out representation of the transmission type changing instruction field 25, the device list indication field 27, the "Search" button 29, the additional device input text box 33, and the "Add" button 35 is released. If the grayed out representation is released, a selection among instructions of "1: Send all Current Values", "2: Send all Update Values" and "3: Send Current and Update Values" is enabled in the transmission type changing instruction field 25. The grayed out representation of the "Remove" button 31 is also released if one or more devices are displayed in the device list indication field 27.

Figure 10:
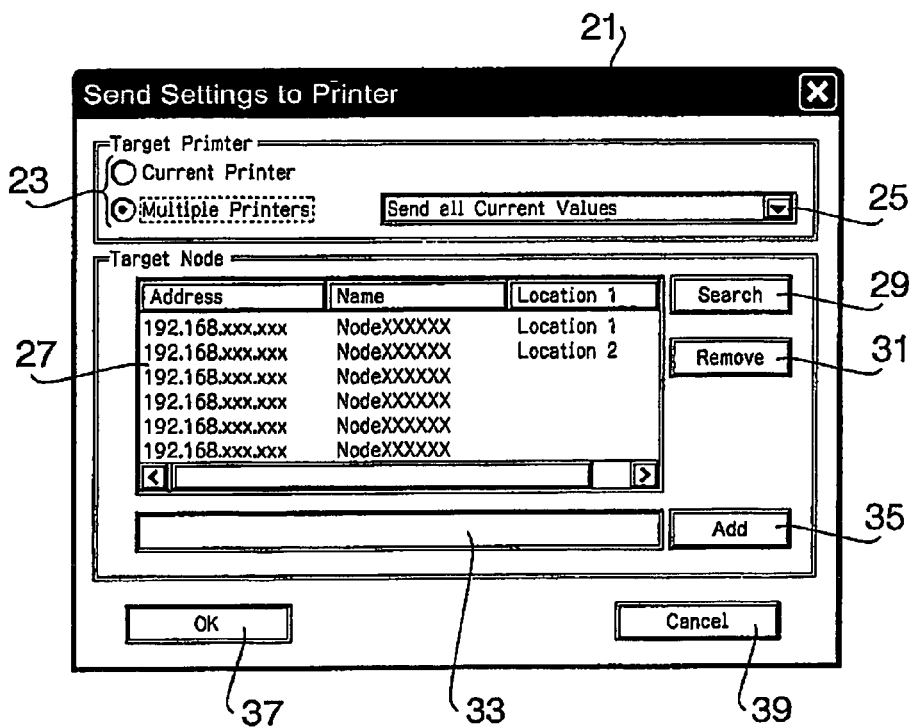
FIG. 10 illustrates a situation where a grayed out representation in the "Send Settings to Printer(s)" dialog box is released.

After the "Send Settings to Printer(s)" dialog box 21 described above is displayed, the PC 1A displays a device list (i.e. contents to be displayed in the device list indication field 27) of the "Send Settings to Printer(s)" in step S203. As described above, the device list indication field 27 is grayed out and no item is displayed in the device list indication field 27 in the initial condition (see FIG. 9). If the user sets the transmission target selection radio button 23 to the "Multiple Printers" in a later stage, the grayed out representation is released and a search to detect devices on the network is initiated automatically. Devices detected by the search are registered in the device list and are displayed on the device list indication field 27 as shown in FIG. 10.

After the step S203 is finished, the PC1 accepts inputs of buttons and keys on the "Send Settings to Printer(s)" dialog box 21 (step S205). In step S205, the user can conduct the switching operation of the transmission target selection radio button 23, an address inputting operation in the additional device input text box 33, and a pressing operation of the "Search" button 29, the "Remove" button 31, the "Add" button 35, the "OK" button 37, or the "Cancel" button 39.

If an address is inputted in the additional device input text box 33 (S207:YES), an inputting process for obtaining character strings inputted in the additional device input text box 33 is executed in step S209. Then, control returns to step S205.

Figure 11:
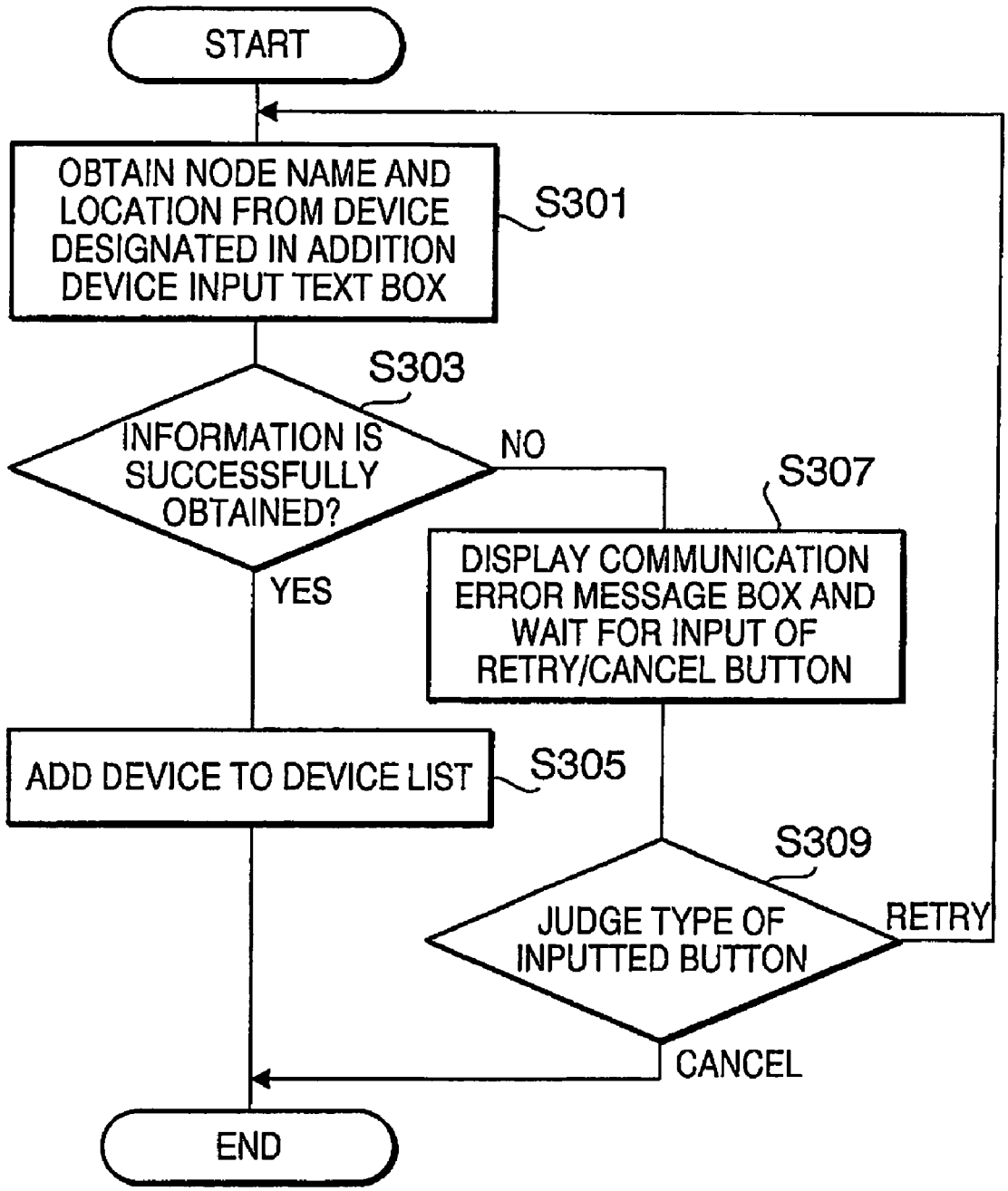
FIG. 11 is a flowchart illustrating a process for adding a designated device to a device list.

If an address is not inputted in the additional device input text box 33 (S207:NO), control proceeds to step S211 where it is judged whether the "Add" button 35 is pressed. If the "Add" button is pressed (S211:YES), a process for adding a device designated in the additional device input text box 33 to the device list is executed (S213). FIG. 11 is a flowchart illustrating the process executed in step S213.

As shown in FIG. 11, the PC 1A operates to obtain information including a node name and a location from a device having the address designated in the additional device input text box 33 (step S301). If the acquisition of the device information is successfully completed (S303: YES), the device is added to the device list (step S305). As a result, information regarding the device having the address designated in the additional device input text box 33 is additionally displayed in the device list indication field 27.

If the acquisition of the device information is not successfully completed (S303:NO), the PC 1A displays a communication error message and waits for an input of either a "Retry" button or "Cancel" button (S307). If the user presses one of the "Retry" and "Cancel" buttons, control proceeds from step S307 to step S309. If the button pressed by the user is the "Retry" button (S309: Retry), control returns to S301. If the button pressed by the user is the "Cancel" button (S309: Cancel) or the step S305 is finished, the process of FIG. 11 terminates. The completion of the process shown in FIG. 1 corresponds to completion of step S213 in FIG. 8.

Returning now to FIG. 8, after step S213 is finished, control returns to step S203.

If the "Add" button is not pressed (S211: NO), control proceeds to step S215 where it is judged whether the "Remove" button 31 is pressed. If the "Remove" button 31 is pressed (S215:YES), a designated device is removed from the device list (S217). Then, control returns to step S203. To designate a device to be removed from the device list, a user selects a device to be removed from devices listed in the device list indication field 27 and then presses the "Remove" button 31.

If the "Remove" button 31 is not pressed (S215: NO), control proceeds to step S219 where it is judged whether the "Search" button 29 is pressed. If the "Search" button 29 is pressed (S219: YES), the PC 1A operates to search for devices on the network to update the device list (step S221). More specifically, in step S221, the PC 1A broadcasts a packet requesting responses from devices on the network according to SNMP, and waits for responses in a few seconds. If a device capable of responding to the packet exists on the network, the device sends a response back to the PC 1A. A device incapable of responding to the packet discards the received packet. The PC 1A recognizes devices which send responses back to the PC 1A as devices to be targeted for the data setting transmission process, updates the device list with regard to the devices which responded, and then adds the devices which respond to the device list indication field 27. After the process of step S221 is finished, control returns to step S203.

If undesired devices which are not to be targeted for the data setting transmission process responded to the packet, the user may delete such undesirable devices using "Remove" button 31.

If the "Search" button 29 is not pressed (S219: NO), control proceeds to step S223 where it is judged whether an operation for changing the transmission type instruction by using the transmission target selection radio button 23 and the transmission type changing instruction field 25 is conducted. If a user operation for changing the instruction of transmission type is conducted (S223: YES), representation of the transmission type changing instruction field 25 is changed in accordance with the changed transmission type, and then the "Send Settings to Printer(s)" dialog box 21 is refreshed (S225).

Figure 12:
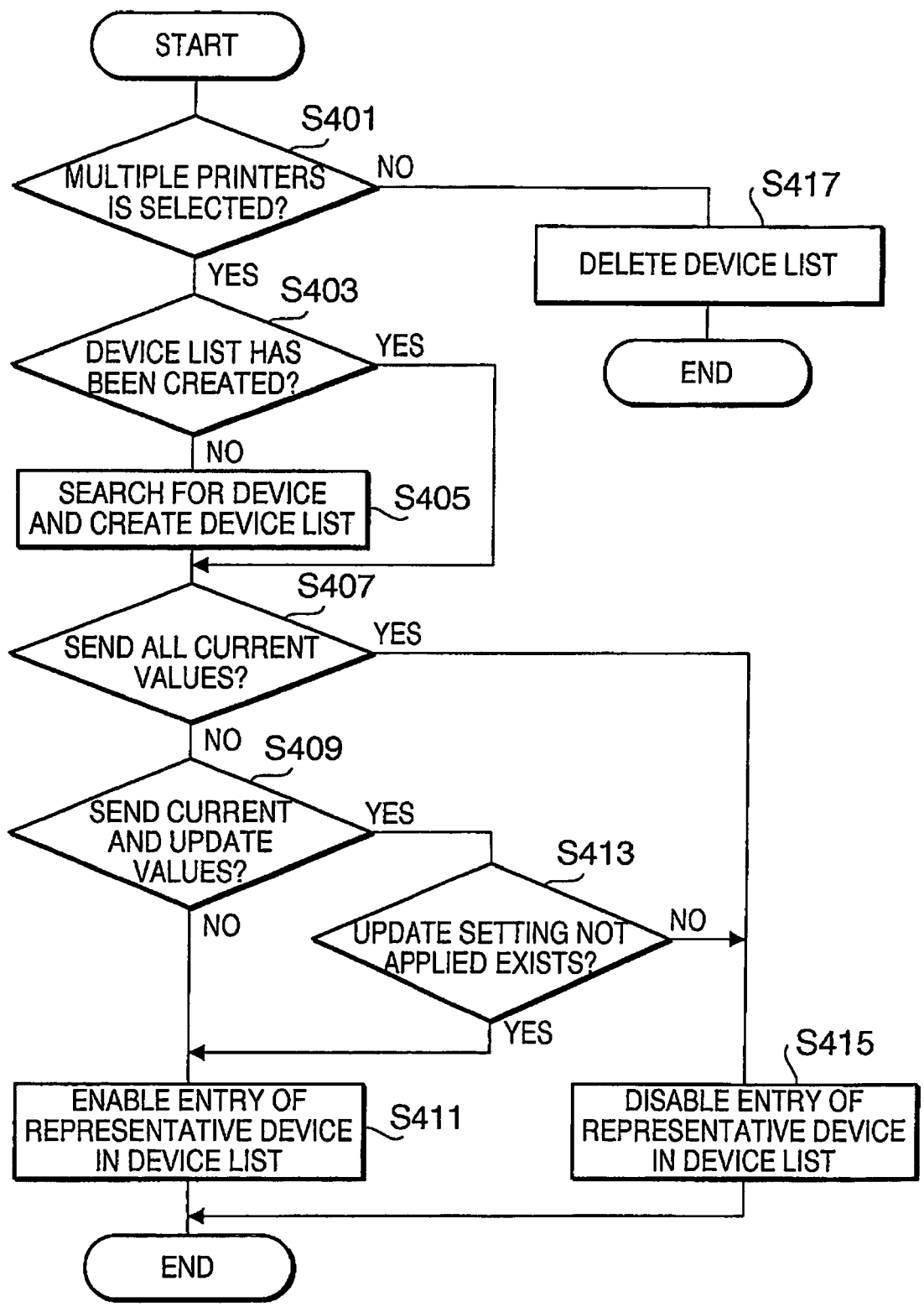
FIG. 12 is a flowchart illustrating a process for searching for devices and for updating the device list.

Then, a process of step S227, which is illustrated in detail in FIG. 12, is executed. In step S227, an operation for searching for devices and an operation for updating the device list are executed on an as needed basis.

As shown in FIG. 12, first, the PC 1A judges whether "Multiple Printers" is selected with the transmission target selection radio button 23 (S401). If the "Multiple Printers" is selected (S401: YES), control proceeds to step S403. In step S403, it is judged whether the device list has been created. If the device list has not been created (S403: NO), the device list is created in step S405 and control proceeds to step S407. If the device list has been created (S403: YES), control proceeds to step 407.

In step S407, it is judged whether "Send all Current Value" is designated in the transmission type changing instruction field 25. In step S409, it is judged whether "Send Current and Update Values" is selected in the transmission type changing instruction field 25. If the "Send all Current Value" is not designated (S407: NO) and "Send Current and Update Values" is not designated (S409: NO), the instruction designated in the transmission type changing instruction field 25 is "Send all Update Values". In this case, in step S411, the device list is modified such that an entry of the representative device, which is selected as the representative device on the UI (i.e., the device setting management tool initial screen 1) displayed before the initiation of the data setting transmission process, is set as valid data.

If the "Send all Current Value" is not designated (S407: NO) and "Send Current and Update Values" is designated (S409: YES), control proceeds to step S413. In step S413, it is checked whether update settings not applied to the representative device exist. If the update settings not applied to the representative device exist (S413: YES), the device list is modified such that the entry of the representative device is set as valid data (S411). If the update settings have been applied to the representative device (S413: NO), control proceeds to step S415 where the entry of the representative device in the device list is designated as invalid data.

If the "Send all Current Value" is designated in the transmission type changing instruction field 25 (S407: YES), control proceeds to step S415 where the entry of the representative device in the device list is designated as invalid data.

If it is judged in step S401 that the "Multiple Printers" is not selected with the transmission target selection radio button 23 (S401: YES), the selection result on the transmission target selection radio button 23 is "Current Printer". In this case, the device list is deleted (S417). After completion of step S411, S415, or S417, the process of FIG. 12 terminates. The termination of the process of FIG. 12 corresponds to the termination of step S227 of FIG. 8.

Referring now to FIG. 8, after completion of step S227, control returns to S203. If the user operation for changing the instruction of transmission type is not conducted (S223: NO), control proceeds to step S229. In step S229, it is judged whether the "OK" button 37 is pressed. In step S231, it is judged whether the "Cancel" button 39 is pressed. If the "OK" button 37 or the "Cancel" button is pressed (S229: YES or S231: YES), control proceeds to step S233. In step S233, the "Send Settings to Printer(s)" dialog box 21 is wiped out. The "Cancel" button 39 is used to instruct the PC 1A to stop a current process, and the "OK" button 37 is used to instruct the PC 1A to continue a current process. The selection result between the "OK" button 37 and the "Cancel" button 39 is used in step S103 of FIG. 7.

If it is judged in step S231 that the "Cancel" button 39 is not pressed (S231: NO), control returns to step S205 since no effective operation is conducted.

After completion of step S233, the process for "Send Settings to Printer(s)" terminates and also the step S101 of FIG. 7 terminates.

Referring now to FIG. 7, after completion of step S101, the PC 1A judges whether the button pressed in step S205 is the "OK" button 37 (S103). If the "OK" button 37 is not pressed (S103: NO), the data setting transmission process terminates since in this case the pressed button is the "Cancel" button 39.

Figure 13:
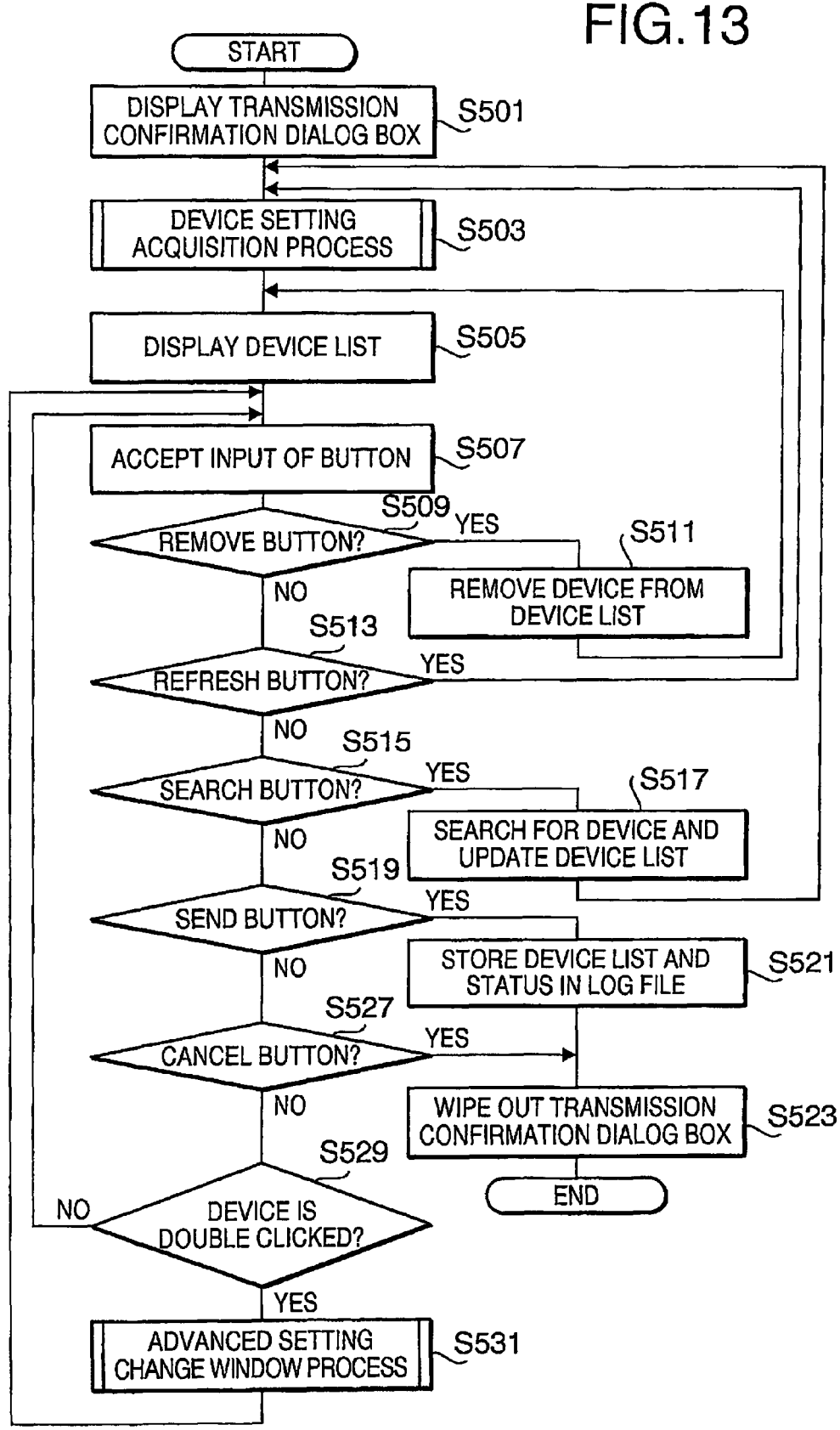
FIG. 13 is flowchart illustrating a transmission confirmation dialog process.
Figure 14:
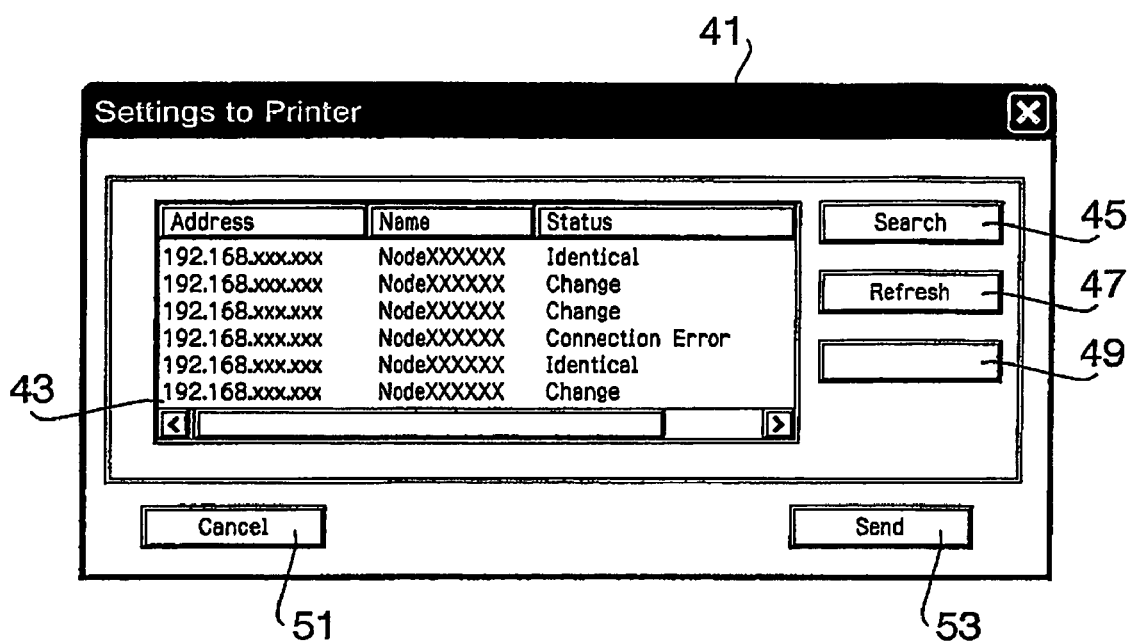
FIG. 14 illustrates a transmission confirmation dialog box.

If the "OK" button 37 is pressed (S103:YES), a transmission confirmation dialog process is executed in step S105. FIG. 13 is a flowchart illustrating the transmission confirmation dialog process. First, in step S501 the PC 1A displays a transmission confirmation dialog box 41 on the display unit 106 as shown in FIG. 14. In the transmission confirmation dialog box 41, information on whether setting data is to be changed, and information on whether devices are in an operable state are displayed for each of the devices. As shown in FIG. 14, the transmission confirmation dialog box 41 includes a device list display field 43, a "Search" button 45, a "Refresh" button 47, a "Remove" button 49, a "Cancel" button 51, and a "Send" button 53. As described in detail later, information regarding the device list is displayed on the device list display field 43 in step S505.

Figure 15:
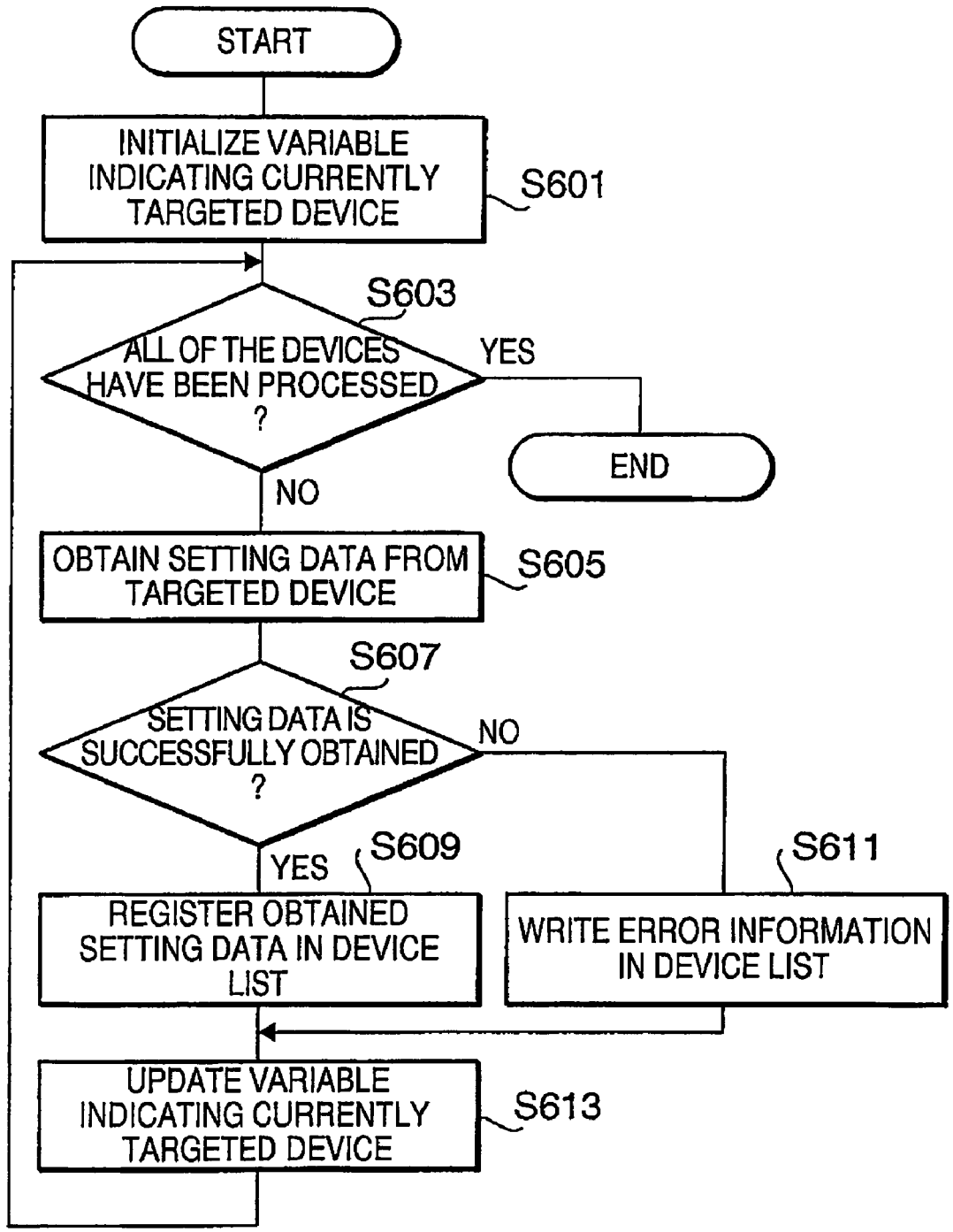
FIG. 15 is a flowchart illustrating a device setting acquisition process.

After the transmission confirmation dialog box 41 is displayed in step S501, the PC 1A executes a device setting acquisition process in step S503. FIG. 15 is a flowchart illustrating the device setting acquisition process.

As shown in FIG. 15, first, the PC 1A initializes a variable i (the number) indicating a device currently targeted for acquisition of device setting (S601). The variable i is used to process devices one by one from the top of the device list. It is noted that a device list used in the device setting acquisition process is created in the "Send Settings to Printer(s)" dialog process, and the device list may be modified in the device setting acquisition process.

To point at a device listed at the top of the device list, the variable i is assigned 1 (i.e. i=1) in step S601. Next, the PC 1A judges whether all of the devices in the device list have been processed (S603). Specifically, in step S603 the PC 1A judges whether a condition i>n (where n represents the total number of devices in the device list) holds. If all of the devices in the device list have not been processed (S603: NO), control proceeds to step S605. In step S605, setting data is obtained from a current device (a device designated by the variable i).

More specifically, the acquisition of setting data from the current device is executed as follows. The PC 1A sends a data acquisition request to the current device based on SNMP. Then, the current device (which has received the data acquisition request) sends setting data stored in the MIB (e.g. the MIB 311 of the printer 3) managed by the current device to the PC 1A in response to the data acquisition request. Setting items to be obtained from the current device vary depending on the transmission type designated in the transmission type changing instruction field 25 of the "Send Settings to Printer (s)" dialog box 21. That is, if the transmission type is "Send all Current Values" or "Send Current and Update Values", setting data of all of the setting items is obtained from the current device. If the transmission type is "Send all Update Values", only setting data of setting items to be updated is obtained from the current device. In this illustrative embodiment, the term "setting items" means items which are predetermined, for each of device models, as target items to be processed in the data setting transmission process and do not cover all of setting items supported by a current device.

Next, in step S607, the PC 1A judges whether the setting data is successfully obtained from the current device. If the setting data is successfully obtained (S607: YES), the obtained setting data is registered in the device list (in a corresponding entry of the device list) (S609). Status information "Identical" is also registered in the corresponding entry of the device list if all of the obtained setting data is identical to setting data to be sent to the current device. Status information "Change" is registered in the corresponding entry of the device list if all of the obtained setting data is not identical to setting data to be sent to the current device.

If the setting data is not successfully obtained (S607: NO), control proceeds to step S611. In step S611, error information is registered in the corresponding entry of the device list. Specifically, in this case, status information "Connection error" may be registered in the corresponding entry of the device list. If the process in step S609 or S611 is finished, the variable i indicates that the current device is updated (S613). Then, control returns to step S603. For example, the variable i may be incremented by one in step S613.

By repeating a sequence of steps S603 to S613, entries in the device list are processed one by one until all of the devices in the device list are completely processed. If all of the devices in the device are processed (S603: YES), the device setting acquisition process of FIG. 15 terminates. Although, in the process shown in FIG. 15, the variable i is used to indicate a device currently targeted for acquisition of setting data, another scheme (for example, a scheme in which a pointer indicating an address of an entry of a device currently targeted for acquisition of setting data is used) may be used to process devices in the device list sequentially.

As shown in FIG. 13, after the process of step S503 is finished, the PC 1A displays contents of the device list on transmission confirmation dialog box 41. By execution of step S503, information of each device is displayed in the device list display field 43, and one of the statuses ("Identical", "Change", "Connection error") is also displayed in the device list display field 43 for each device.

Next, the PC 1A accepts inputs from buttons on the transmission confirmation dialog box 41 (S507). In this stage, the PC 1A allows the user to operate one of the "Search" button 45, "Refresh" button 47, "Remove" button 49, "Cancel" button 51, and "Send" button 53.

Figure 16:
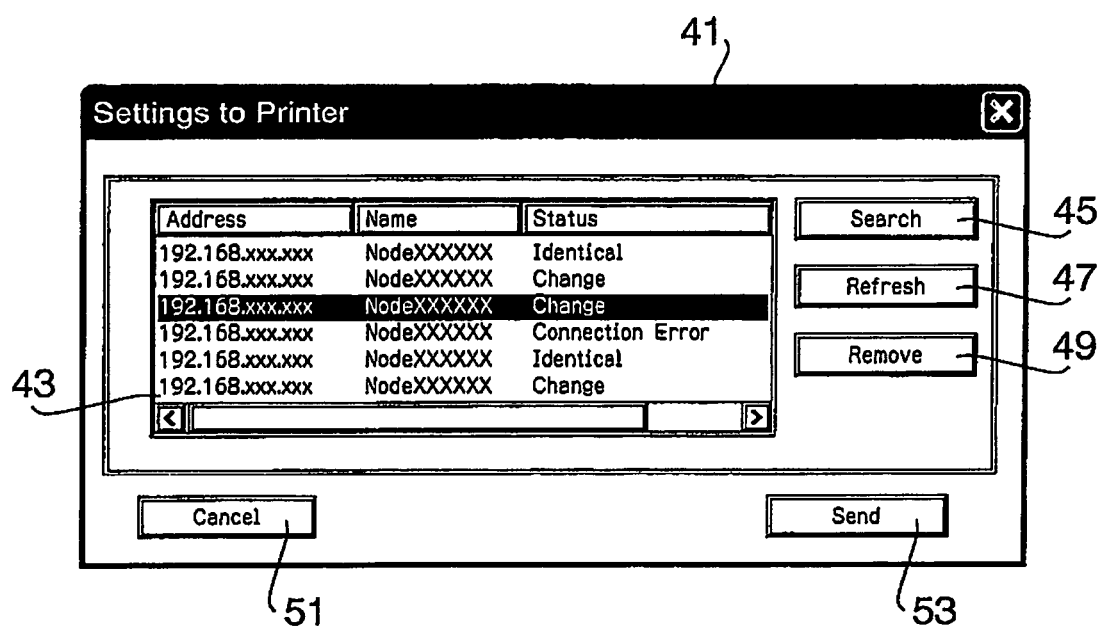
FIG. 16 illustrates a situation where grayed out representation of the transmission confirmation dialog box is released.

If the "Remove" button 49 is pressed (S509: YES), a designated device is removed from the device list (S511). The designation of a device to be removed from the device list is performed by selecting a device on the device list display field 43 and then pressing the "Remove" button 49. The "Remove" button 49 is grayed out in an initial condition as shown in FIG. 14, and the grayed out representation of the "Remove" button 49 is released when one of the devices is designated in the device list display field 43 (see FIG. 16).

If the "Remove" button 49 is not pressed (S509: NO), control proceeds to step S513 where it is judged whether the "Refresh" button 47 is pressed. If the "Refresh" button 47 is pressed (S515: YES), control returns to step S503 to execute again the device setting acquisition process. Consequently, the information in the device list display field 43 is updated.

Next, in step S515, the PC 1A judges whether the "Search" button 45 is pressed. If the "Search" button 45 is pressed (S515: YES), control proceeds to step S517. In step S517, the PC 1A searches for devices on the network to update the device list. More specifically, in step S517, the PC 1A broadcasts a packet requesting responses from devices on the network according to SNMP, and waits for responses in a few seconds. If a device capable of responding to the packet exists on the network, the device sends a response back to the PC 1A. A device incapable of responding to the packet discards the received packet. The PC 1A recognizes devices which send responses back to the PC 1A as devices to be targeted for the data setting transmission process, updates the device list with regard to devices which respond, and then refreshes information in the device list display field 43. After the process of step S517 is finished, control returns to step S503.

If undesired devices which are not to be targeted for the data setting transmission process according to the illustrative embodiment responded to the packet, the user may delete such undesirable devices using "Remove" button 49.

If the "Search" button 45 is not pressed (S515: NO), control proceeds to step S519 where it is judged whether the "Send" button 53 is pressed. If the "Send" button 53 is pressed (S519: YES), the contents of the device list containing the statuses ("Identical", "Change", "Connection error") is recorded in a log file (S521), and the transmission confirmation dialog box 41 is wiped out (S523). Then, the transmission confirmation dialog process terminates.

If it is judged in step S519 that the "Send" button 53 is not pressed (S519: NO), control proceeds to step S527 where the PC 1A judges whether the "Cancel" button 51 is pressed. If the "Cancel" button 51 is pressed (S527: YES), the transmission confirmation dialog box 41 is wiped out (S523). Then, the transmission confirmation dialog process terminates.

As described above, the step S523 is executed in both of the cases where the "Send" button 53 is pressed and where the "Cancel" button 51 is pressed, but the step S521 is executed only in the case where the "Send" button 53 is pressed. Pressing the "Send" button 53 instructs the PC 1A to continue the transmission confirmation dialog process, and pressing the "Cancel" button 51 instructs the PC 1A to stop the transmission confirmation dialog process. Information on whether the "Send" button 53 is pressed or the "Cancel" button 51 is pressed is used in step S107 of FIG. 7 as described later.

If it is judged in step S527 that the "Cancel" button 51 is not pressed (S527: NO), control proceeds to step S529. If it is judged in step S529 that no device in the device list display field 43 is double clicked (S529: NO), control returns to step S507 since no effective operation is made by the user. If a device in the device list display field 43 is double clicked (S529: YES), the PC 1A executes an advanced setting change window process.

Figure 17:
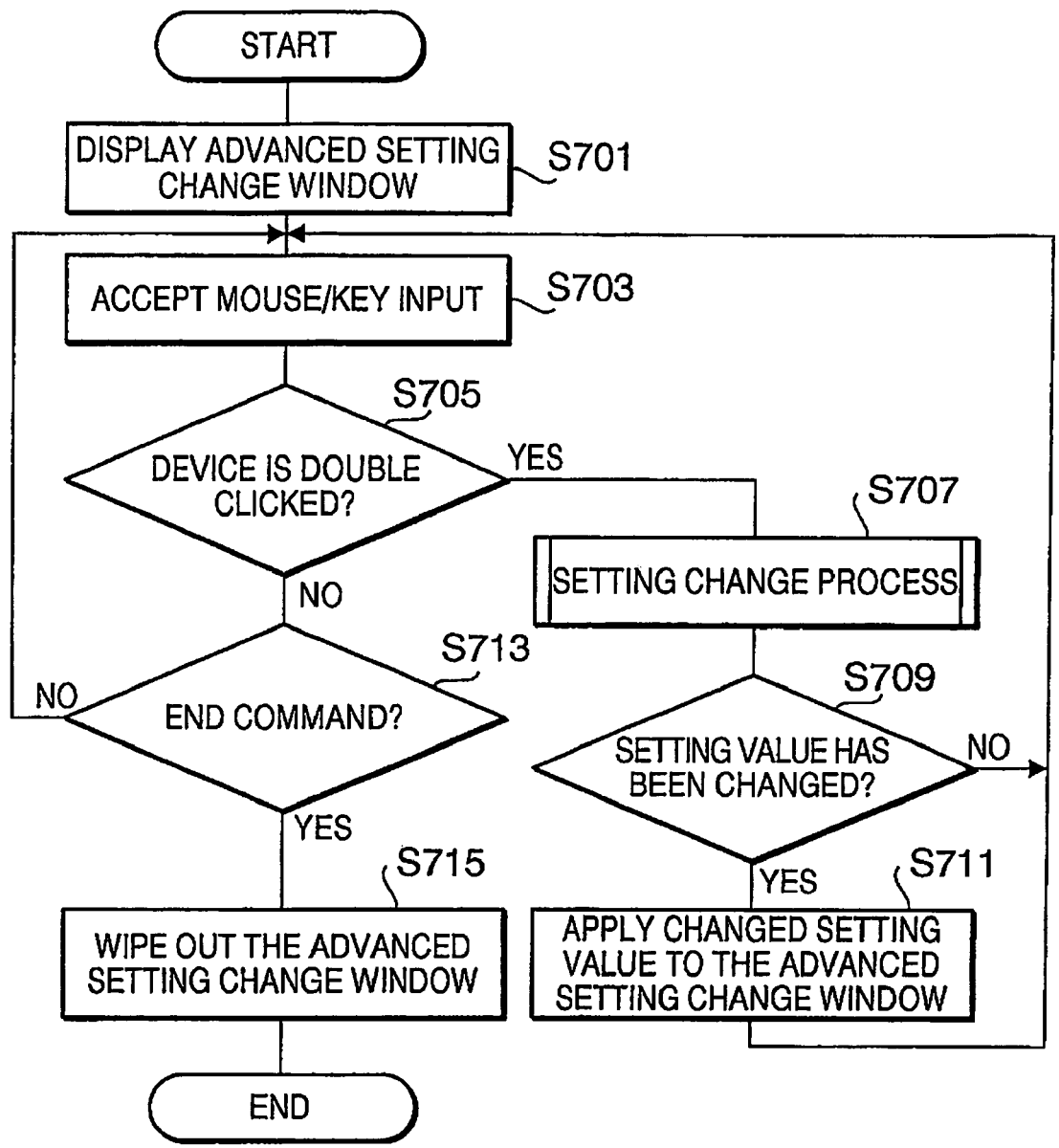
FIG. 17 is a flowchart illustrating an advanced setting change window process.

The advanced setting change window process is a process for making settings for each device on an individual basis. To a device which is not subjected to the advanced setting change window process, setting data identical to the representative device or setting data which is modified in the above mentioned process is transmitted. On the other hand, to a device which is subjected to the advanced setting change window process, setting data set in the advanced setting change window process is transmitted. FIG. 17 is a flowchart illustrating the advanced setting change window process.

First, the PC 1A displays an advanced setting change window (S701). The setting items are different between the first data setting transmission process for setting the principal function of a target device and the second data setting transmission process for setting the NIC (network interface card) of the target device. Specifically, an advanced setting change window 55 as shown in FIG. 18 is displayed in the case of the first data setting transmission process, and an advanced setting change window 57 as shown in FIG. 19 is displayed in the case of the second data setting transmission process.

In each of the advanced setting change windows 55 and 57, various items are displayed in an "Item" box for which setting values are to be transmitted to a device targeted for the advanced setting (a target device), setting values (current setting values) obtained from the target device are displayed in a "Current Value" box, and setting values to be updated are displayed in an "Update value" box. An item whose setting value in the "Update value" box is blank represents that an "Update value" and a "Current value" of such an item are identical to each other. If a device represented as a "Connection Error" in the device list display field 43 has been selected for the advanced setting change window process, all of fields in the "Current value" box and "Update value" box are represented as blanks. Although setting items are different between the advanced setting change window 55 and the advanced setting change window 57, these windows 55 and 57 are functionally equal to each other.

In step S703, the PC 1A accepts the input from the input device 105 (e.g. a mouse and keys). If one of items in the advanced setting change window 55 or the advanced setting change window 57 has been double clicked in step S703, the PC 1A judges that a setting value is changed (S705: YES). Then, the PC 1A executes a setting change process.

Figure 20:
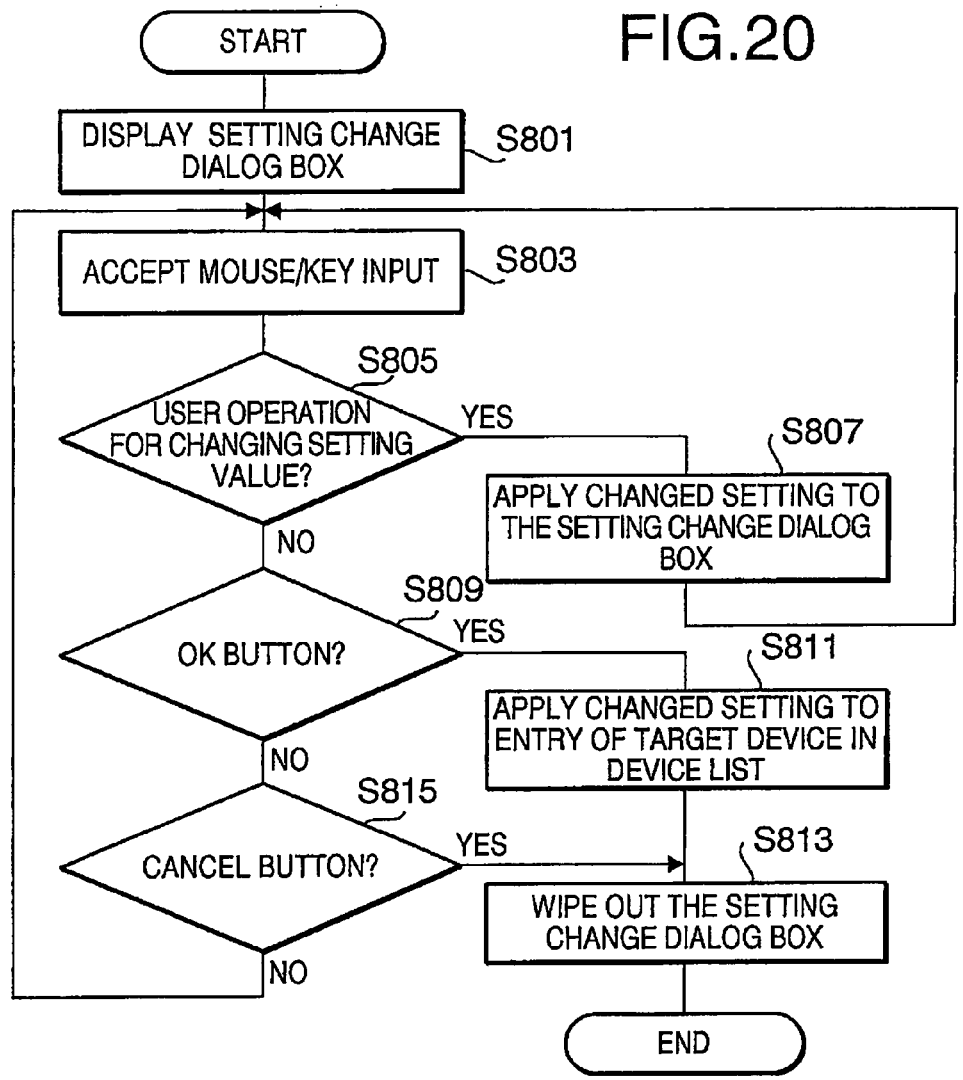
FIG. 20 is a flowchart illustrating a setting change process.
Figure 21:
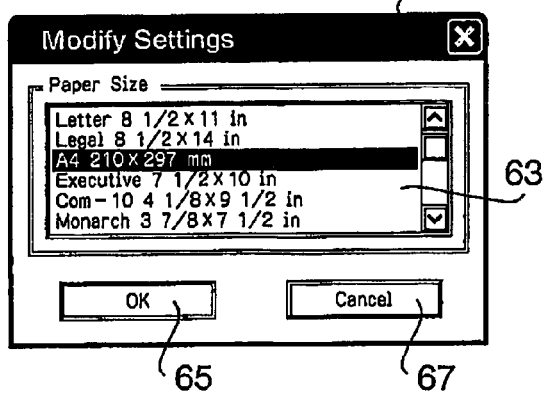
FIG. 21 illustrates a setting change dialog box.

FIG. 20 is a flowchart illustrating the setting change process. First, the PC 1A displays a setting change dialog box. Contents to be displayed in the setting change dialog box changes depending on the type of item double clicked in the advanced setting change window 55 or the advanced setting change window 57. FIG. 21 shows a setting change dialog box 61 which is displayed if the item "PaperSize" in the advanced setting change window 55 is double clicked.

As shown in FIG. 21, the setting change dialog box 61 includes a setting value selection box 63, an "OK" button 65 and a "Cancel" button 67. The setting value selection box 63, the "OK" button 65 and the "Cancel" button 67 are included in the setting change dialog box for all of the items in the advanced setting change windows 55 and 57.

After the setting change dialog box is displayed (S801), the PC 1A accepts the input from the input device 105 (e.g. a mouse and keys) in step S803. If one of setting values in the setting value selection box 63 is clicked, the PC 1A judges that a user operation for changing the setting value has been conducted (S805: YES). Then, the PC 1A applies the change of the setting value to the representation in the setting value selection box 63 (S807). Next, control returns to step S803.

If the user operation for changing the setting value has not been conducted (S805: NO), control proceeds to step S809. In step S809, it is judged whether the "OK" button 65 is pressed. If the "OK" button 65 is pressed (S809: YES), the changed setting value is applied to a corresponding entry (i.e. an entry corresponding to the device targeted for the advanced setting) in the device list (S811). Thus, the setting data designated in the setting change process is registered in the corresponding entry in the device list.

Since the setting data set by the advanced setting is unique to the device targeted for the advanced setting, the setting data set by the advanced setting is stored separately from changed setting data common to the other devices. After the step S811 is finished, the setting change dialog box 61 is wiped out (S813). Then, the setting change process terminates.

If it is judged in step S809 that the "OK" button 65 is not pressed (S809: NO), control proceeds to step S815. In step S815, it is judged whether the "Cancel" button 67 is pressed. If the "Cancel" button 67 is pressed (S815: YES), step S813 is processed and then the setting change process terminates. If the "Cancel" button 67 is not pressed (S815: NO), control returns to step S803 since no effective operation is conducted.

Referring now to FIG. 17, after the setting change process shown in FIG. 20 (i.e. step S707) is finished, control proceeds to step S709. In step S709, it is judged whether setting values have been changed. Specifically, in step S709, the PC 1A judges whether the "OK" button 65 has been pressed or the "Cancel" button 67 has been pressed. If the setting values have been changed (S709: YES), changed setting values are applied to the advanced setting change windows 55 and 57 (S711). Then, control returns to step S703.

If the setting values have not been changed (S709: NO), control returns to step S703 without executing step S711.

If no device is double clicked in the advanced setting change windows 55 and 57 (i.e. setting values have not been changed) (S705: NO), control proceeds to step S713. In step S713, it is judged whether an end command (e.g. clicking a "x" button at the upper right position of a window, or pressing of "Alt"+"F4" keys) is inputted. If the end command is not inputted (S713: NO), control returns to step S703 since no effective operation is conducted. If the end command is inputted (S713: YES), the advanced setting change window 55 or 57 is wiped out (S715), and then the advanced setting change window process terminates.

As shown in FIG. 13, after the advanced setting change window process shown in FIG. 17 (i.e. step S531) is finished, control returns to step S507.

Referring now to FIG. 7, if the transmission confirmation dialog process of steps S501 to S531 is finished (i.e. step S105 is finished) by the operation of pressing the "Send" button 53 or the "Cancel" button 51, control proceeds to step S107 where the PC 1A judges whether the "Send" button 53 has been pressed. If the "Send" button 53 has not been pressed (S107: NO), control returns to step S101 to start again the data setting transmission process since in this case the "Cancel" button 51 has been pressed.

Figure 22:
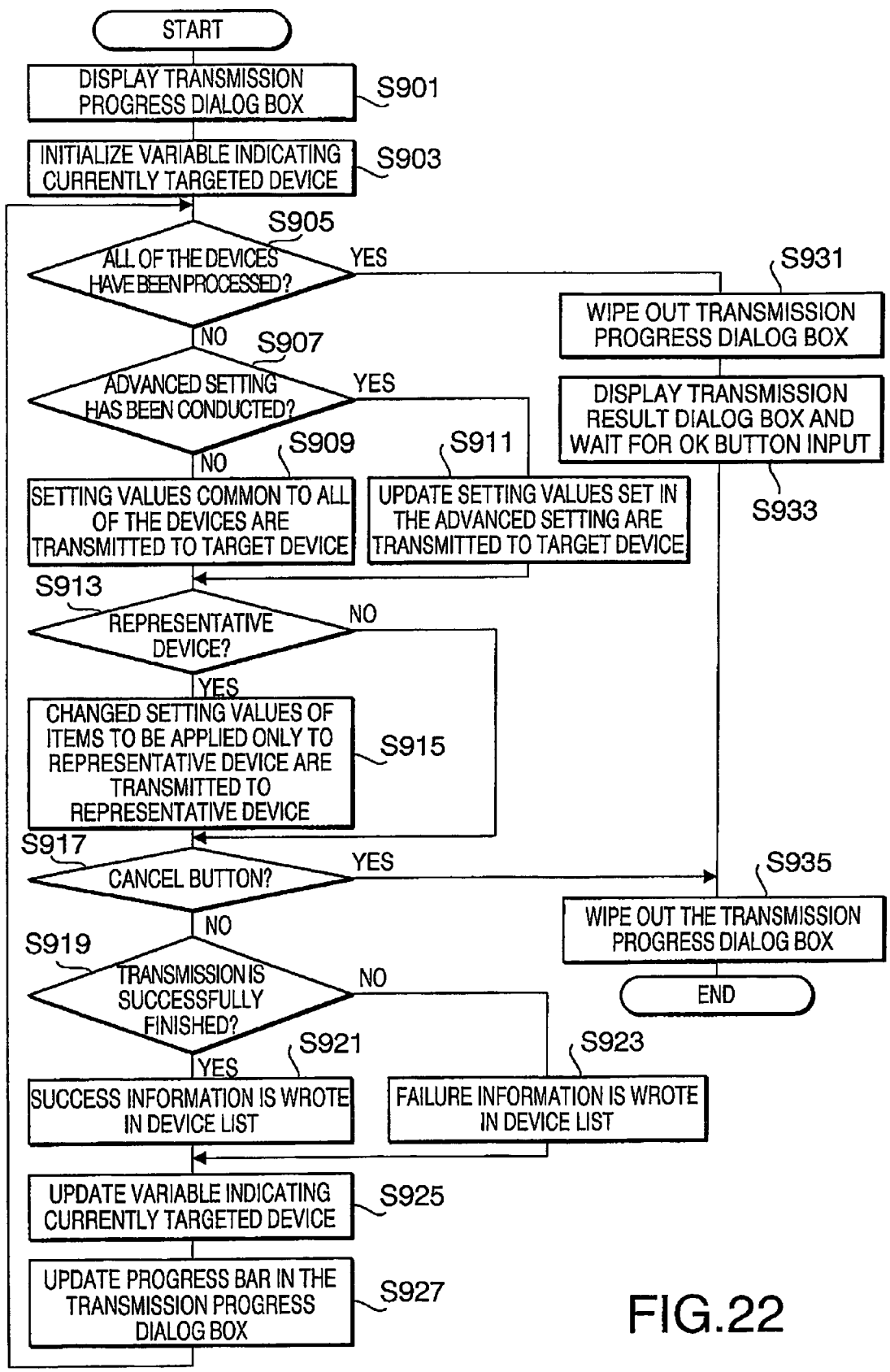
FIG. 22 is a flowchart illustrating a setting data package transmission process.
Figure 23A:
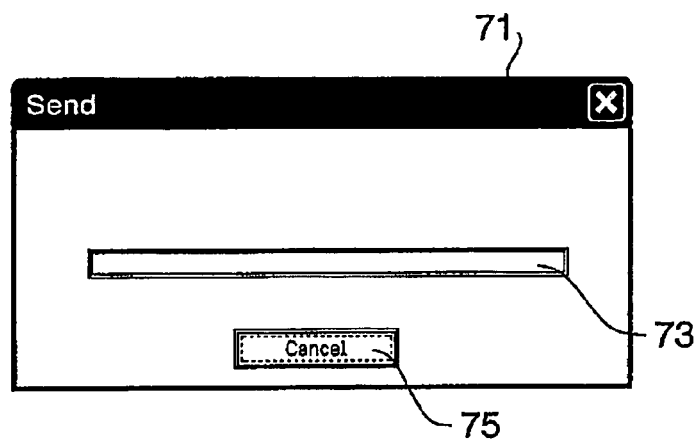
FIGS. 23A and 23B illustrate a transmission progress dialog box.
Figure 23B:
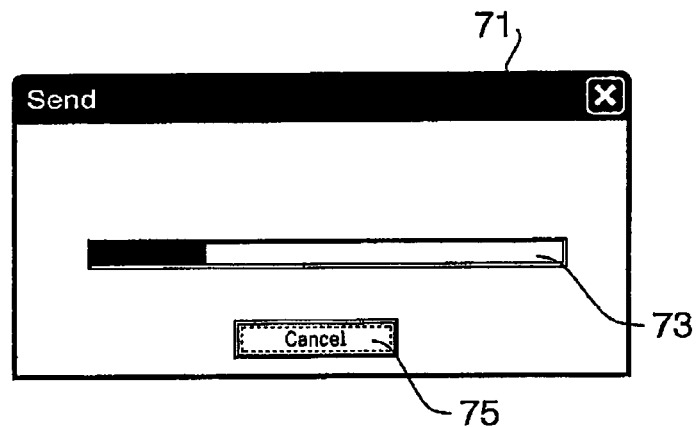

If the "Send" button 53 has been pressed (S107: YES), control proceeds to step S109 where a setting data package transmission process is executed. FIG. 22 is a flowchart illustrating the setting data package transmission process. First, the PC 1A displays a transmission progress dialog box 71 which is shown in FIGS. 23A and 23B (S901). As shown in FIGS. 23A and 23B, the transmission progress dialog box 71 includes a progress bar indication field 73 and a "Cancel" button 75. In the transmission progress dialog box 71, the progress of data transmission is represented. In an initial state, no progress bar is displayed in the progress bar indication field 73 (see FIG. 23A).

After the transmission progress dialog box 71 is displayed, the PC 1A initializes a variable i indicating the number of a target device being subjected to the setting data package transmission process (S903). The variable i is used to processes devices one by one from the top of the device list. To point at a device listed at the top of the device list, the variable i is assigned 1 (i.e. i=1) in step S903.

Next, the PC 1A judges whether all of the devices have been processed (S905). Specifically, in step S905 the PC 1A judges whether a condition i>n (where n represents the total number of devices in the device list) holds. If all of the devices in the device list have not been processed (S905: NO), control proceeds to step S907. In step S907, the PC 1A judges whether the advanced setting has been conducted.

If the advanced setting has not been conducted (S907: NO), control proceeds to step S909 where the setting values common to all of the devices in the device list are sent to the target device (the i-th device) by using setting values obtained from the representative device (i.e. the representative device selected on the user interface (UI) displayed before the initiation of the data setting transmission process) (S909). Specifically, in step S909, the data transmission is executed as follows. If the transmission type designated in the transmission type changing instruction field 25 is the "Send all Current Values", setting data identical to that of the representative device is transmitted to the target device. If the transmission type designated in the transmission type changing instruction field 25 is the "Send all Update Values", updated setting data which is updated with respect to current settings of the representative device is transmitted to the target device. If the transmission type designated in the transmission type changing instruction field 25 is the "Send Current and Update Values", both of the setting data identical to that of the representative device and the updated setting data which is updated with respect to current settings of the representative device are transmitted to the target device.

If the advanced setting has been conducted (S907: YES), update setting values set in the advanced setting change window process are transmitted to the target device (S911). The processes in steps S909 and S911 are executed in accordance with SNMP. That is, the PC 1A sends a data set request to the target device (the i-th device). The target device stores the setting values in the MIB (e.g. the MIB 311 in the case of the printer 3), which is managed by the target device, in accordance with the data set request transmitted from the PC 1A.

Next, the PC 1A judges whether the target device (being subjected to the setting data package transmission process) is the representative device (S913). If the target device is the representative device (S913: YES), changed setting values with regard to items to be applied only to the representative device are transmitted the target device (S915). The items to be applied only to the representative device are determined in advance. For example, in the case of the settings of the NIC (network interface card), the items to be applied only to the representative device are "Node Name" (a node name of the NIC), "Password" (an administrator password), service filter settings, "IP Address" (an IP address of the NIC), "Subnet Mask" (a subnet mask of the NIC), "Gateway" (gateway (router) address settings), "IP Config" (settings of a scheme of IP address acquisition), "Printer E-mail Address" (an E-mail address assigned to a printer/MFP), "POP3 account name" (an account name of a mail box used to access an E-mail sever), "POP3 account Password" (a password for the account of the mail box) because these items have to be set on a network interface card-by-network interface card basis.

After the process of step S915 is finished or it is judged in step S913 that the target device is not the representative device (S913: NO), control proceeds to step S917. In step S917, it is judged whether the "Cancel" button is pressed. If the "Cancel" button is not pressed (S917: NO), the PC 1A judges whether the setting data transmission is successfully finished (S919). If the setting data transmission is successfully finished (S919: YES), success information (e.g. letters "OK") indicating that the setting data transmission is successfully finished for the target device is written in the device list (S921). If the setting data transmission is not successfully finished (S919: NO), failure information (e.g. letters "NG") indicating that the setting data transmission is not successfully finished for the target device and information about factors that cause transmission errors are written in the device list (S923).

After the success information or the failure information is written in the device list, the variable (the number) indicating the target device is updated in step S925, for example, by incrementing the variable i by one. Then, the progress bar displayed in the progress bar indication field 73 in the transmission progress dialog box 71 is updated (S927). Specifically, the length of the progress bar to be displayed in the progress bar indication field 73 is determined in accordance with the following expression.

[the length of the progress bar]=[the maximum length of the progress bar]·[the number of processed devices]/[the total number of devices]

Thus, the progress bar having the length obtained from the above expression is displayed in the progress bar indication field 73 as shown in FIG. 23B. Next, control returns to step S905. By repeating the sequence of steps S905 to S927, all of the devices in the device list are processed. If all of the devices have been processed, the judgment result in step S905 becomes "YES". Although, in the above mentioned process from S905 to S927, the variable i which is counted up from 1 to n is used to indicate the target device, another scheme (for example, a scheme in which a pointer indicating an address of an entry of the target device) may be used to process devices in the device list sequentially.

Figure 24:
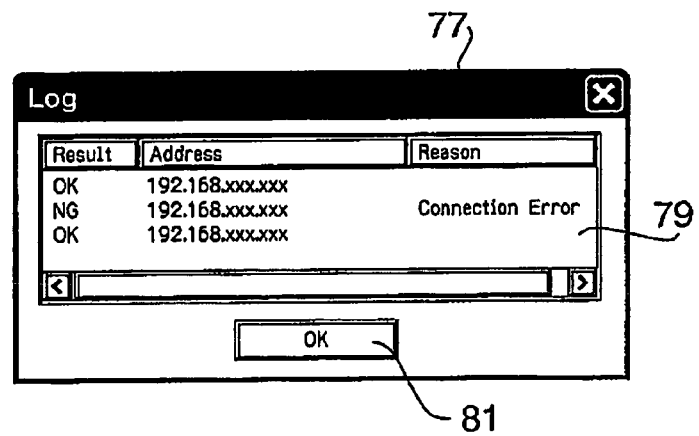
FIG. 24 illustrates a transmission result dialog box.

If all of the devices have been processed (S905: YES), the PC 1A wipes out the transmission progress dialog box 71 (S931). Then, the PC 1A displays a transmission result dialog box 77 (see FIG. 24), and waits for an operation of the "OK" button 81 (S933). As shown in FIG. 24, the transmission result dialog box 77 includes a transmission result indication field 79 and an "OK" button 81. In the transmission result indication field 79, the success information, the failure information and communication error factors are displayed. For example, in the transmission result indication field 79, the display of "Connection Error" represents that the connection to a device ends in failure and the setting of the device has not been completed, and the display of "Password incorrect" represents that the setting of a device is impossible because of an incorrect password.

Such representation of information (success or error information) in the transmission result indication field 79 allows the user to recognize a problem regarding setting data update and to deal with a problem appropriately.

If the "OK" button 81 is pressed, control proceeds step S935 where the transmission result dialog box 77 is wiped out. Then, the setting data package transmission process shown in FIG. 22 terminates.

Referring now to FIG. 7, after the process of step S109 (i.e. the setting data package transmission process shown in FIG. 22) is finished, the data setting transmission process shown in FIG. 7 terminates.

If it is judged in step S917 of FIG. 22 that the "Cancel" button is pressed (S917: YES), the PC 1A wipes out the transmission result dialog box 77 (S935). Then, the setting data package transmission process terminates. Therefore, in the case where the judgment result of step S917 is "YES", the process of step S109 of FIG. 17 also terminates.

As described above, if the "Send" button 17 in the "General" tab of the NIC setting dialog box 15 is pressed, the PC 1A operates to execute the second data setting transmission process to transmit the setting data. Meanwhile, as shown in FIG. 6, inputting fields for various types of items are provided in the NIC setting dialog box 15 so as to accept user operations for inputting setting data. If the user operation is conducted on the NIC setting dialog box 15, there is a possibility that setting values different from the setting values transmitted by the second data setting transmission process are inputted to the NIC setting dialog box 15.

Figure 25:
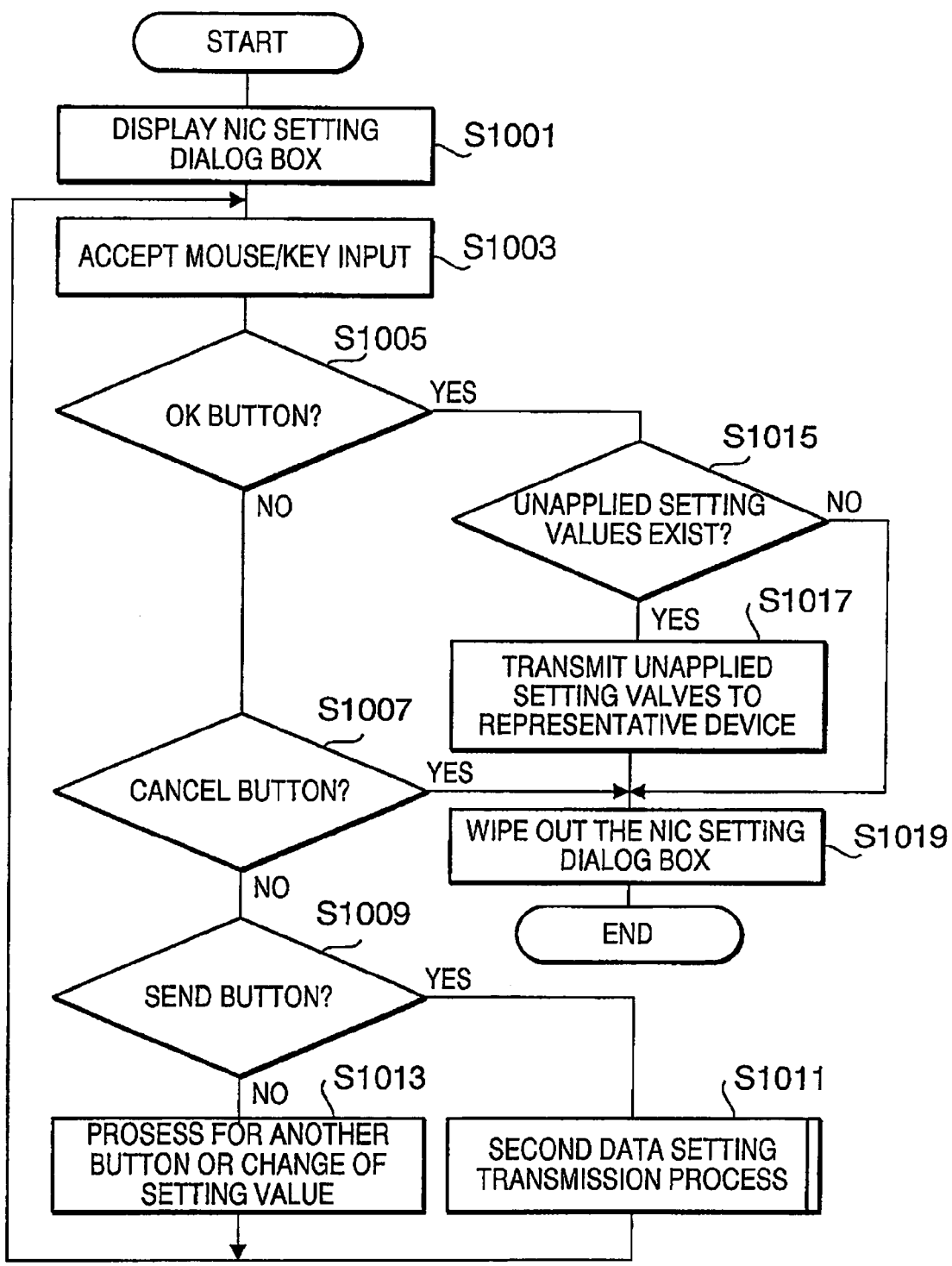
FIG. 25 is a flowchart illustrating a NIC setting dialog displaying process.

For this reason, a NIC setting dialog displaying process is executed as follows. FIG. 25 is a flowchart illustrating the NIC setting dialog displaying process. First, the PC 1A displays the NIC setting dialog box (S1001). Then, in step S1003, the PC 1A accepts the inputs from the input device (e.g. a mouse and keys). Next, the PC 1A judges whether the "OK" button is pressed in step S1005, judges whether the "Cancel" button is pressed in step S1007, and judges whether the "Send" button is pressed in step S1009.

If it is judged in step S1009 that the "Send" button is pressed (S1005: NO, S1007: NO, S1009: YES), the second data setting transmission process described above is executed (S1011). Then, control returns to step S1003.

If it is judged in step S1009 that the "Send" button is not pressed (S1005: NO, S1007: NO, S1009: NO), another process for treating user operations for changing settings is executed (S1013). Then, control returns to step S1003.

Since the NIC setting dialog displaying process includes the step S1013, there is a possibility that a user has inputted setting values in the NIC setting dialog box when it is judged in step S1005 that the "OK" button is pressed. If the user has inputted setting values in the NIC setting dialog box, it is necessary to transmit the setting values inputted by the user in the NIC setting dialog box to the representative device independently of the process of step S1011.

For this reason, if it is judged in step S1005 that the "OK" button is pressed (S1005: YES), the PC 1A judges whether unapplied setting values exist in the input fields of the NIC setting dialog box (S1015). If unapplied setting values exist (S1015: YES), the PC 1A transmits the unapplied setting values to the representative device (S1017). Next, the PC 1A wipes out the NIC setting dialog box 15 (S1019). Then, the NIC setting dialog displaying process terminates.

If it is judged in step S1007 that the "Cancel" button is pressed (S1007: YES), the PC 1A wipes out the NIC setting dialog box 15 (S1019). Then, the NIC setting dialog displaying process terminates.

As described above, according to the data setting transmission process of the illustrative embodiment, setting data identical to that of the representative device and/or changed setting data (updated with respect to settings of the representative device) are transmitted to more than one device at a time (in the setting data package transmission process). In addition, the transmission confirmation dialog box 41 is displayed so as to allow a user to recognize in advance whether setting values are to be actually changed for each of the devices.

In the case where setting values (new setting values) are transmitted to more than one device at a time, there is a possibility that the new setting values are different from the current setting values (current setting data) with regard to one of the devices and the new setting values are identical to the current setting values with regard to another one of the devices. However, according to the illustrative embodiment, whether the setting values are to be updated is displayed in the transmission confirmation dialog box 41 for all of the devices in the device list. Such a configuration allows a user to easily recognize whether the setting data is to be updated or not for each of the devices.

Therefore, the occurrence of a situation, where an unnecessary setting data update is made for non-target devices (devices which are not targeted for setting data update) and a necessary setting data update is not made for target devices (devices which are targeted for the setting data update) if inappropriate setting data by error is transmitted to more than one device simultaneously, is prevented.

Although the present invention has been described in considerable detail with reference to certain illustrative embodiments thereof, other illustrative embodiments are possible.

In the above mentioned illustrative embodiment, if it is not necessary to transmit setting values to the representative device, a user is required to use the "Remove" button to remove the representative device from targets for the data setting transmission process because in the above mentioned illustrative embodiment the representative device is typically included in the targets for the data setting transmission process.

Figure 26:
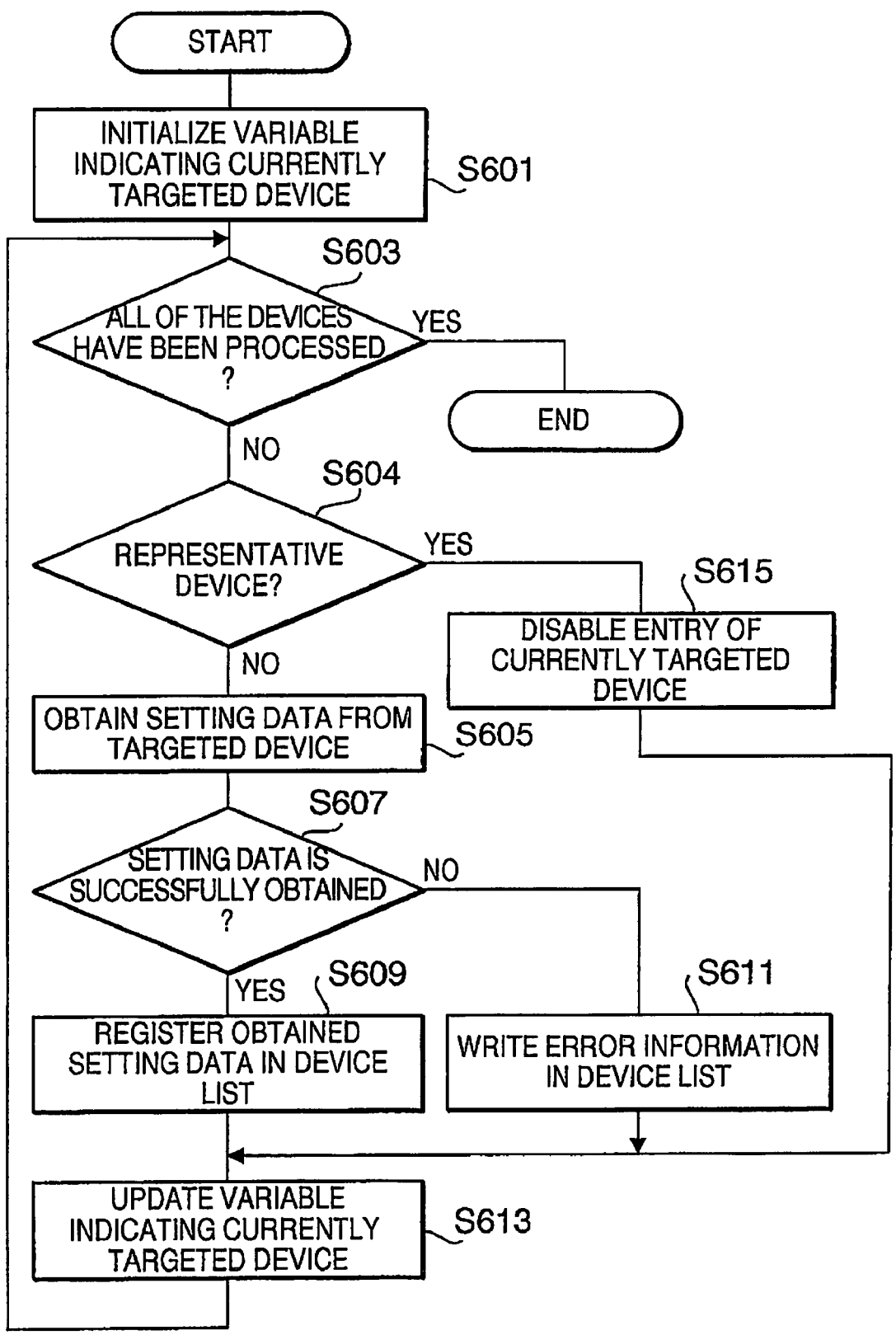
FIG. 26 is a variation of the device setting acquisition process shown in FIG. 15.
Figure 27:
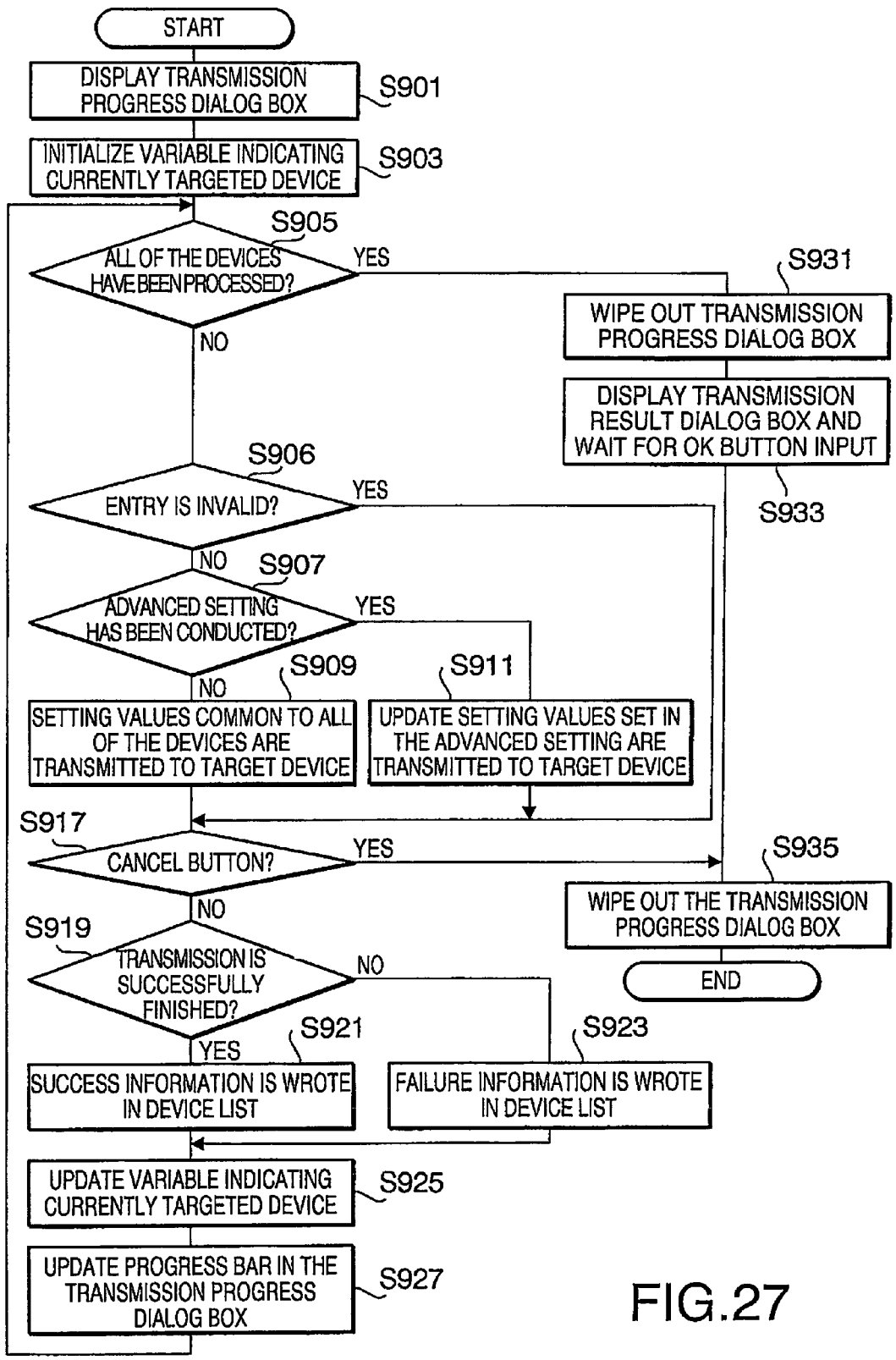
FIG. 27 is a variation of the setting data package transmission process of FIG. 22.

However, the data setting transmission process may be configured such that the representative device is excluded in advance from the targets for the data setting transmission process. Such a configuration for excluding the current device from the targets for the data setting transmission process is attained by a configuration shown in FIGS. 26 and 27. FIG. 26 is a variation of the device setting acquisition process shown in FIG. 15. FIG. 27 is a variation of the setting data package transmission process of FIG. 22. In the variation shown in FIG. 26, steps S604 and S615 are added to the device setting acquisition process of FIG. 15.

In the process shown in FIG. 26, if it is judged that all of the devices have not been processed (S603: NO), the PC 1A judges whether the target device (the i-th device) is the representative device (S604). If it is judged in step S604 that the target device is the representative device (S604: YES), control proceeds to step S615. In step S615, the PC 1A disables an entry corresponding to the representative device in the device list so that steps S605 to S611 are not executed for the representative device. That is, the entry of the representative device is designated as an invalid entry. After the step S615 is finished, control proceeds to step S613. If it is judged in step S604 that the target device is not the representative device (S604: NO), control proceeds to step S605.

In the variation shown in FIG. 27, step S906 is added to the process of FIG. 22 and steps S913 and S915 are omitted from the process of FIG. 22. According to the variation shown in FIG. 27, if it is judged in step S905 that all of the devices have not been processed (S905: NO), the PC 1A judges whether an entry corresponding to the target device in the device list is invalid. If it is judged in step S906 that the entry is invalid (S906: YES), control proceeds to step S917 without executing the steps 907 to S911.

Consequently, acquisition of setting data from the target device, transmission of new setting data or setting data set by the advanced setting are skipped for the representative device.

Although in the above mentioned illustrative embodiment the data setting transmission process is targeted for printing devices such as a printer, the illustrative embodiment can be also applied to various types of devices, for example, a scanner, an image obtaining device (such as a network camera), an image communication device (such as a facsimile device), a communication routing device (such as a network point), an information sever device (such as a network storage), which are typically used in such a situation that setting values are substantially common to more than one device.

In the above mentioned illustrative embodiment only the PC 1A contributes to the data setting transmission process. That is, only the PC 1A functions as a setting data transmitting device. However, setting data transmission function may be distributed over at least two nodes. If such a distributed system is configured such that output data of a functional block implemented in one node is used as input data to be inputted to a functional block implemented in another node, the distributed system is implemented as a network system that also functions similarly to the data transmission device. For example, such a distributed system on a network may be implemented by use of PCs 1A, 1B and 1C.

Although in the above mentioned illustrative embodiment the setting data to be transmitted to the target devices in the device list are prepared by obtaining the current setting data currently set to the representative device, such setting data to be transmitted to the target devices may be inputted manually by a user. Alternatively or additionally, samples of setting data to be transmitted to the target devices may be prepared in advance in the PC 1A (1B or 1C), and one of the samples may be selected as the setting data to be transmitted to the target devices.

Alternatively, a management server having the function of obtaining current setting data currently set to the target devices in the device list from the target devices through the network may be connected to the network. In this case, the current setting data of the target devices is obtained from the management server without directly accessing the target devices.

What is claimed is:

1. A method of transmitting setting data from a terminal device to a plurality of target devices on a network, comprising the steps of:
  receiving user selection of a representative device;
  obtaining representative setting data from the representative device;
  preparing one of the representative setting data and modified setting data as new common setting data, wherein the modified setting data is made by modifying the representative setting data;
  for each target device of the plurality of target devices, obtaining current setting data to which the each target device, of the plurality of target devices, is currently set;
  comparing the new common setting data with the current setting data of each of the plurality of target devices;
  providing notification of a result of the comparison;
  receiving a user selection of at least two intended target devices from the plurality of target devices responsive to the result of the comparison, wherein the at least two intended target devices includes the representative device; and
  in response to a single user-inputted transmission command, for each target device of the at least two intended target devices:
    transmitting the new common setting data to the each target device of the at least two intended target devices,
    determining whether the each target device of the at least two intended target devices corresponds to the representative device, and
    in response to determining that the each target device of the at least two intended target devices corresponds to the representative device, transmitting, to the representative device, individual setting data different from the new common setting data, wherein the individual setting data includes at least one setting value that is unique to the representative device.

2. The method according to claim 1, wherein the step of providing includes displaying error information for each target device for which the current setting data is not successfully obtained.

3. The method according to claim 1, wherein the step of providing includes providing a list of the plurality of target devices and the step of receiving the user selection of at least two intended target devices includes receiving a user request to remove a device from the list of the plurality of target devices.

4. The method according to claim 1, wherein the step of providing the notification comprises displaying information identifying whether a portion of the new common setting data is different from the current setting data for each of the plurality of target devices.

5. The method according to claim 1, wherein the individual setting data is transmitted only to the representative device.

6. The method according to claim 1, further comprising the step of storing the result of the comparison in a log file.

7. The method according to claim 1, further comprising the steps of:
  receiving a user modification of the current setting data to generate individual setting data for an intended one of the at least two intended target devices in response to the step of providing; and
  transmitting the individual setting data to the intended one of the at least two intended target devices.

8. The method according to claim 7, wherein the step of receiving the user modification of the current setting data comprises:
  receiving a user selection of at least one advanced setting target device from among the plurality of target devices; and
  receiving a user modification of an advanced setting for the selected at least one advanced setting target device.

9. The method according to claim 1, further comprising the steps of:
  allowing the user to input a refresh command after performing the step of providing the notification of the result of the comparison; and performing again the steps of obtaining the current setting data to which each of the plurality of target devices is currently set, comparing, and providing prior to the step of transmitting the new common setting data if the refresh command is inputted by the user.

10. The method according to claim 1, further comprising the steps of:
allowing the user to input a search command after performing the step of providing the notification of the result of the comparison;
searching for devices to be included in the plurality of target devices if the search command is inputted by the user; and
performing again the steps of obtaining the current setting data to which each of the plurality of target devices is currently set, comparing, and providing prior to the step of transmitting the new common setting data if the search command is inputted by the user.

11. The method according to claim 1, further comprising the step of performing again the steps of obtaining the current setting data to which the plurality of target devices is currently set and comparing upon receipt of a search command.

12. The method according to claim 1,
further comprising:
searching for devices to be included in the plurality of target devices;
accepting a user designation of a device to be included in the plurality of target devices; and
selecting a device found in the search for devices and the device designated by the user as the plurality of target devices.

13. The method according to claim 1, wherein:
the new common setting data includes a single piece of data; and
the current setting data includes a plurality of pieces of data set to one of the plurality of target devices.

14. A non-transitory computer-readable storage medium having computer-executable instructions stored thereon, which when executed by a processor perform a method of transmitting setting data from a terminal device to a plurality of target devices on a network, the method comprising the steps of:
receiving user selection of a representative device;
obtaining representative setting data from the representative device, wherein the representative setting data is specific to the representative device;
preparing one of the representative setting data and modified setting data as new common setting data, wherein the modified setting data is made by modifying the representative setting data;
for each of the plurality of target devices, obtaining current setting data to which the each target device, of the plurality of target devices, is currently set;
comparing the new common setting data with the current setting data of each of the plurality of target devices;
providing notification of a result of the comparison; and
receiving a user selection of at least two intended target devices from the plurality of target devices based on the result of the comparison, wherein the at least two intended target devices include the representative device; and
in response to a single user-inputted transmission command, for each target device of the at least two intended target devices:
transmitting the new common setting data to the each target device of the at least two intended target devices,
determining whether the each target device of the at least two intended target devices corresponds to the representative device, and
in response to determining that the each target device of the at least two intended target devices corresponds to the representative device, transmitting the individual setting data to the representative device, wherein the individual setting data includes at least one setting value that is unique to the representative device.

15. The computer readable storage medium according to claim 14, wherein the step of providing includes displaying error information for each target device for which the current setting data is not successfully obtained.

16. The computer readable storage medium according to claim 14, wherein the step of providing includes providing a list of the plurality of target devices and the step of receiving the user selection of the at least two intended target devices includes receiving a user request to remove a device from the list of the plurality of target devices.

17. The computer readable storage medium according to claim 14,
wherein the step of providing the notification comprises displaying information identifying whether a portion of the new common setting data is different from the current setting data for each of the plurality of target devices.

18. The computer readable storage medium according to claim 14, wherein the individual setting data is transmitted only to the representative device.

19. The computer readable storage medium according to claim 14, wherein the method further comprises a step of storing the result of the comparison in a log file.

20. The computer readable storage medium according to claim 14, wherein the method further comprises the steps of:
allowing a user to modify the current setting data to generate individual setting data for an intended one of the at least two intended target devices in response to the step of providing; and
transmitting the individual setting data to the intended one of the at least two intended target devices.

21. The computer readable storage medium according to claim 20, wherein the step of the allowing the user to modify the current setting data comprises:
allowing the user to select at least one advanced setting target device from among the plurality of target devices; and
allowing the user to modify an advanced setting for the selected at least one advanced setting target device.

22. The computer readable storage medium according to claim 14, wherein the method further comprises the steps of:
allowing the user to input a refresh command after performing the step of providing the notification of the result of the comparison; and
performing again the steps of obtaining the current setting data to which each of the plurality of target devices is currently set, comparing, and providing if the refresh command is inputted by the user.

23. The computer readable storage medium according to claim 14, wherein the method further comprises the steps of:
allowing the user to input a search command after performing the step of providing the notification of the result of the comparison; and
searching for devices to be included in the plurality of target devices if the search command is inputted by the user.

24. The computer readable storage medium according to claim 14, wherein the method further comprises performing again the steps of obtaining the current setting data to which each target device of the plurality of target devices is currently set and comparing upon receipt of a search command.

25. The computer readable storage medium according to claim 14,
wherein the method further comprises the steps of:
searching for devices to be included in the plurality of target devices;
accepting a user designation of a device to be included in the plurality of target devices; and
selecting a device found in the search for devices and the device designated by the user as the plurality of target devices.

26. The computer readable storage medium according to claim 14, wherein:
the new common setting data includes a single piece of data; and
the current setting data includes a plurality of pieces of data set to one of the plurality of target devices.

27. A system for transmitting setting data to a plurality of target devices on a network, comprising:
a processor; and
memory operatively coupled to the processor and storing computer readable instructions that, when executed, cause the system to:
receive a user selection of a representative device;
obtain representative setting data from the representative device;
prepare one of the representative setting data and modified setting data as new common setting data, wherein the modified setting data is made by modifying the representative setting data;
for each of the plurality of target devices, obtain current setting data to which the each target device, of the plurality of target devices, is currently set;
compare the new common setting data with the current setting data of each of the plurality of target devices;
provide notification of a result of the comparison of the new common setting data with the current setting data of each of the plurality of target devices;
receive a user selection of at least two intended target devices from the plurality of target devices responsive to the comparison result, wherein the at least two intended target devices include the representative device; and
in response to a single user-inputted transmission command, for each target device of the at least two intended target devices:
transmit the new common setting data to the each target device of the at least two intended target devices,
determine whether the each target device of the at least two intended target devices corresponds to the representative device, and
in response to determining that the each target device of the at least two intended target devices corresponds to the representative device, transmit individual setting data to the representative device, wherein the individual setting data includes at least one setting value unique to the representative device.

* * * * *